United States Patent
Nakazawa

(10) Patent No.: US 11,987,766 B2
(45) Date of Patent: *May 21, 2024

(54) LUBRICATING OIL COMPOSITION FOR INTERNAL COMBUSTION ENGINE

(71) Applicant: ENEOS CORPORATION, Tokyo (JP)

(72) Inventor: Hiroki Nakazawa, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,662

(22) Filed: Aug. 19, 2021

(65) Prior Publication Data

US 2022/0064564 A1  Mar. 3, 2022

(30) Foreign Application Priority Data

Aug. 31, 2020 (JP) ................................ 2020-146408
Jun. 4, 2021 (JP) ................................ 2021-094588

(51) Int. Cl.

| | | |
|---|---|---|
| *C10M 169/04* | (2006.01) | |
| *C10M 101/02* | (2006.01) | |
| *C10M 129/54* | (2006.01) | |
| *C10M 145/14* | (2006.01) | |
| *C10M 149/10* | (2006.01) | |
| *C10M 155/00* | (2006.01) | |
| *C10M 157/10* | (2006.01) | |
| *C10M 161/00* | (2006.01) | |
| *C10N 20/00* | (2006.01) | |
| *C10N 20/02* | (2006.01) | |
| *C10N 20/04* | (2006.01) | |
| *C10N 30/02* | (2006.01) | |
| *C10N 30/04* | (2006.01) | |
| *C10N 40/25* | (2006.01) | |

(52) U.S. Cl.
CPC ...... *C10M 169/044* (2013.01); *C10M 101/02* (2013.01); *C10M 129/54* (2013.01); *C10M 145/14* (2013.01); *C10M 149/10* (2013.01); *C10M 155/00* (2013.01); *C10M 157/10* (2013.01); *C10M 161/00* (2013.01); *C10M 2203/1006* (2013.01); *C10M 2207/262* (2013.01); *C10M 2209/084* (2013.01); *C10M 2217/028* (2013.01); *C10M 2229/00* (2013.01); *C10N 2020/02* (2013.01); *C10N 2020/04* (2013.01); *C10N 2020/071* (2020.05); *C10N 2030/02* (2013.01); *C10N 2030/04* (2013.01); *C10N 2040/25* (2013.01)

(58) Field of Classification Search
CPC ............ C10M 169/044; C10M 129/54; C10M 145/14; C10M 149/10; C10M 155/00; C10M 157/10; C10M 161/00; C10M 101/02; C10M 2203/1006; C10M 2207/262; C10M 2209/084; C10M 2217/028; C10M 2229/00; C10M 129/50; C10M 101/00; C10M 107/02; C10M 149/22; C10M 169/04; C10M 2217/046; C10M 2207/141; C10M 2207/144; C10N 2040/25; C10N 2020/02; C10N 2030/04; C10N 2020/071; C10N 2020/04; C10N 2030/02; C10N 2010/04

See application file for complete search history.

(56) References Cited

U.S. PATENT DOCUMENTS

| | | | | |
|---|---|---|---|---|
| 6,638,897 | B2 * | 10/2003 | Ogano | .................. C10M 133/56 |
| | | | | 508/192 |
| 8,980,805 | B2 * | 3/2015 | Doyen | .................. C10M 163/00 |
| | | | | 508/583 |
| 2009/0298729 | A1 * | 12/2009 | Schober | ............... C10M 167/00 |
| | | | | 508/370 |
| 2015/0197705 | A1 | 7/2015 | Matsui et al. | |
| 2015/0203785 | A1 | 7/2015 | Matsui et al. | |

(Continued)

FOREIGN PATENT DOCUMENTS

| | | |
|---|---|---|
| CN | 107075405 A | 8/2017 |
| JP | 2008-144019 | 6/2008 |

(Continued)

OTHER PUBLICATIONS

Office Action issued in U.S. Appl. No. 17/406,599, filed Jan. 20, 2023.
Notice of Allowance issued in U.S. Appl. No. 17/406,599 dated May 16, 2023.
U.S. Office Action issued in U.S. Appl. No. 17/406,599 dated Jan. 6, 2022.
Final Office Action issued in U.S. Appl. No. 17/406,599, filed Jul. 21, 2022.

*Primary Examiner* — Cephia D Toomer
(74) *Attorney, Agent, or Firm* — GREENBLUM & BERNSTEIN P.L.C.

(57) ABSTRACT

A lubricating oil composition for an internal combustion engine has a HTHS viscosity at 150° C. of 2.25 to <2.55 mPa·s and includes: (A) a lubricating base oil including (a) mineral base oil(s) and/or (a) synthetic base oil(s), and having a kinematic viscosity at 100° C. of 3.8-4.6 mm$^2$/s; (B) 1000-2000 mass ppm, in terms of metal content, of a metallic detergent including (a) metal salicylate detergent (s), and delivering ≥10 mmol/kg of total salicylate soap base per kilogram of the composition; (C) 1.0 to 4.0 mass % of a comb-shaped poly(meth)acrylate having a Mw of 350,000-1,000,000 and a PDI of ≤4.0; and (D) 100-1000 mass ppm, in terms of nitrogen, of a succinimide dispersant including (i) (a) non-modified succinimide dispersant(s) and/or (ii) (a) boric acid-modified succinimide dispersant(s), wherein the (i) and the (ii), in total, deliver ≥70 mass % of total nitrogen content of the component (D).

19 Claims, No Drawings

(56) References Cited

U.S. PATENT DOCUMENTS

| | | | |
|---|---|---|---|
| 2016/0010023 A1* | 1/2016 | Matthews | C10M 171/02 |
| | | | 508/459 |
| 2016/0024416 A1 | 1/2016 | Kamano | |
| 2016/0024417 A1 | 1/2016 | Kamano | |
| 2017/0096616 A1* | 4/2017 | Suetsugu | C10M 143/10 |
| 2017/0137732 A1* | 5/2017 | Utaka | C10L 1/1641 |
| 2017/0183601 A1 | 6/2017 | Utaka | |
| 2017/0298287 A1* | 10/2017 | Tamura | C10M 139/00 |
| 2017/0369808 A1 | 12/2017 | Kushuhara | |
| 2018/0023026 A1 | 1/2018 | Kushuhara | |
| 2020/0263106 A1* | 8/2020 | Ueda | C10M 145/14 |

FOREIGN PATENT DOCUMENTS

| | | |
|---|---|---|
| JP | 2013-170217 | 9/2013 |
| JP | 2015-196696 | 11/2015 |
| JP | 2016-148004 | 8/2016 |
| JP | 2016-196667 | 11/2016 |
| JP | 2017-226793 | 12/2017 |
| JP | 2019-089938 | 6/2019 |
| WO | 2014/017557 | 1/2014 |
| WO | 2014/017559 | 1/2014 |
| WO | 2014/136970 | 9/2014 |
| WO | 2014/136973 | 9/2014 |
| WO | 2016/152679 | 9/2016 |

* cited by examiner

LUBRICATING OIL COMPOSITION FOR INTERNAL COMBUSTION ENGINE

FIELD

The present invention relates to a lubricating oil composition for an internal combustion engine.

BACKGROUND

Since the invention thereof, the internal combustion engine has served as a power source for various transportation means for many years. In recent years, fuel efficiency required for the internal combustion engine has been just increasing. In order to meet this requirement, high fuel efficiency is required for lubricating oils for the internal combustion engine, too.

Among various transportation means, the automobile is responsible for the transportation much on land. The improvement of the automobile in fuel efficiency has attracted a great deal of interest. For further improvement of the automobile in fuel efficiency, a hybrid electric vehicle with a power unit including an internal combustion engine and an electric motor in combination has been proposed and has been commercially successful. Hybrid electric vehicles are classified into two types: a series-hybrid electric vehicle such that only (an) electric motor(s) is/are mechanically connected to a drive system, the vehicle always runs by the power of the electric motor(s), and the internal combustion engine is operated so as to maintain a predetermined rotational speed most efficient for exclusively generating electric power for driving the electric motor(s); and a parallel-hybrid electric vehicle such that both the internal combustion engine and the electric motor(s) are mechanically connected to a drive system, and the vehicle runs as the output load is suitably distributed to or switched between the internal combustion engine and the electric motor(s) according to the speed. The internal combustion engine has the most efficient rotational speed. As the rotational speed is lower than the most efficient rotational speed, the torque lowers. The torque of the electric motor at a low rotational speed is high, but the higher the rotational speed is, the lower the efficiency of the electric motor is. The parallel-hybrid electric vehicle makes it possible for the internal combustion engine and the electric motor to compensate for each other's disadvantages, which can enhance the fuel efficiency over the whole speed range from low speed to high speed.

CITATION LIST

Patent Literature

Patent Literature 1: JP 2015-196696 A
Patent Literature 2: WO 2014/136973 A1
Patent Literature 3: JP 2016-196667 A
Patent Literature 4: WO 2016/152679 A1
Patent Literature 5: WO 2014/136970 A1
Patent Literature 6: JP 2019-089938 A
Patent Literature 7: JP 2008-144019 A
Patent Literature 8: JP 2017-226793 A
Patent Literature 9: JP 2016448004 A
Patent Literature 10: JP 2013-170217 A
Patent Literature 11: WO 2014/017557 A1
Patent Literature 12: WO 2014/017559 A1

SUMMARY

Technical Problem

However, in the hybrid electric vehicle, particularly in the parallel-hybrid electric vehicle, the internal combustion engine may repeatedly start and stop frequently. In such an operation mode, the engine oil does not reach a sufficiently high temperature, which leads to a tendency that moisture generated by combustion of hydrocarbon fuels condenses inside the internal combustion engine and accumulates in the engine oil. In the case of an internal combustion engine of an automobile which is not a hybrid electric vehicle but such an automobile that generates a driving force of running solely by the internal combustion engine, there is also a concern that moisture condenses inside the internal combustion engine and accumulates in the engine oil if the temperature difference between a high-temperature portion and a low-temperature portion of the engine is large.

The present inventor has found that low-temperature fluidity of an engine oil contaminated with water is prone to be degraded. When the low-temperature viscosity of an engine oil increases, the stirring resistance of the engine oil increases under low-temperature conditions, which leads to deterioration of fuel efficiency.

An object of the present invention is to provide a lubricating oil composition for an internal combustion engine which is capable of suppressing degradation of low-temperature fluidity of the composition when the composition is contaminated with water.

Solution to Problem

The present invention encompasses the following embodiments [1] to [8].

[1] A lubricating oil composition for an internal combustion engine, the composition comprising:
(A) a lubricating base oil comprising at least one mineral base oil or at least one synthetic base oil or any combination thereof, and having a kinematic viscosity at 100° C. of 3.8 to 4.6 mm$^2$/s;
(B) a metallic detergent comprising at least one metal salicylate detergent, wherein the component (B) is present in an amount of 1000 to 2000 mass ppm in terms of metal content on the basis of the total mass of the composition, and wherein the component (B) is present in an amount of no less than 10 mmol/kg in terms of total molar amount of any salicylate soap base per kilogram of the composition;
(C) at least one comb-shaped poly(meth)acrylate in an amount of 1.0 to 4.0 mass % in terms of resin content on the basis of the total mass of the composition, the comb-shaped poly(meth)acrylate having a weight average molecular weight of 350,000 to 1,000,000 and a polydispersity index of no more than 4.0; and
(D) a succinimide dispersant in an amount of 100 to 1000 mass ppm in terms of nitrogen on the basis of the total mass of the composition, the component (D) comprising at least one non-modified succinimide dispersant or at least one boric acid-modified succinimide dispersant or any combination thereof, wherein a total nitrogen content derived from the non-modified succinimide dispersant and the boric acid-modified succinimide dispersant is no less than 70 mass % of a total nitrogen content of the component (D),
wherein the composition has HTHS viscosity at 150° C. of no less than 2.25 mPa·s and less than 2.55 mPa·s.

In the present specification, "kinematic viscosity at 100° C." means a kinematic viscosity at 100° C. specified in ASTM D-445; "(meth)acrylate" means "acrylate and/or methacrylate"; and "HTHS viscosity at 150° C." means a high temperature high shear viscosity at 150° C. specified in ASTM D4683.

[2] The lubricating oil composition according to [1], wherein the (A) lubricating base oil is at least one Group III base oil of API base stock categories, or at least one Group IV base oil of API base stock categories, or any combination thereof.

[3] The lubricating oil composition according to [1] or [2], wherein the component (B) is present in an amount of no less than 15 mmol/kg in terms of total molar amount of any soap base per kilogram of the composition.

[4] The lubricating oil composition according to any one of [1] to [3], wherein a total salicylate soap base of the component (B) is no less than 50 mol % of a total soap base of the component (B).

[5] The lubricating oil composition according to any one of [1] to [4], wherein the component (C) has a weight average molecular weight of greater than 400,000 and no more than 1,000,000.

[6] The lubricating oil composition according to any one of [1] to [5], wherein a ratio B/N of a total boron content B of the component (D) to a total nitrogen content N of the component (D) is 0 to 0.60.

[7] The lubricating oil composition according to any one of [1] to [6], wherein the component (D) is a condensation reaction product of an alkyl- or alkenyl-succinic acid or anhydride thereof with a polyamine, or a modified product of the condensation reaction product, or any combination thereof, wherein the alkyl- or alkenyl-succinic acid has an alkyl or alkenyl group having 40 to 400 carbon atoms.

[8] The lubricating oil composition according to any one of [1] to [7], wherein the composition is used to lubricate an internal combustion engine of a hybrid electric vehicle.

Advantageous Effects

The lubricating oil composition for an internal combustion engine according to the present invention can suppress degradation of low-temperature fluidity of the composition when the composition is contaminated with water.

DESCRIPTION OF EMBODIMENTS

The present invention will be described hereinafter. It is noted that expression "A to B" concerning numeral values A and B means "no less than A and no more than B" unless otherwise specified. In such expression, if a unit is added only to the numeral value B, the same unit shall be applied to the numeral value A. A word "or" means a logical sum unless otherwise specified. In the present specification, expression "$E_1$ and/or $E_2$" concerning elements $E_1$ and $E_2$ means "$E_1$, or $E_2$, or the combination thereof", and expression ". . . , $E_{N-1}$, and/or $E_N$" concerning elements $E_1$, . . . , $E_N$ (N is an integer of 3 or more) means "$E_1$, . . . , $E_{N-1}$, or $E_N$, or any combination thereof". In the present specification, "alkaline earth metal" encompasses magnesium.

In the present specification, unless otherwise specified, the content of each element of calcium, magnesium, zinc, phosphorus, sulfur, boron, barium, and molybdenum in an oil shall be measured by inductively coupled plasma atomic emission spectrometry (intensity ratio method (internal standard method)) conforming to JIS K0116, and the content of a nitrogen element in an oil shall be measured by the chemiluminescence method conforming to JIS K2609. In the present specification, "weight average molecular weight" and "number average molecular weight" of a polymer mean a weight average molecular weight and a number average molecular weight measured by gel permeation chromatography (GPC) in terms of standard polystyrene, respectively. The measurement conditions for GPC are as follows.

[GPC Measurement Conditions]
device: ACQUITY™ APC UV RI System manufactured by Waters Corporation column: two columns of ACQUITY™ APC XT900A manufactured by Waters Corporation (gel particle size: 2.5 μm, column size (inner diameter×length): 4.6 mm×150 mm); and one column of ACQUITY™ APC XT200A manufactured by Waters Corporation (gel particle size: 2.5 μm, column size (inner diameter×length): 4.6 mm×150 mm), connected in series in order from the upstream side column temperature: 40° C.
sample solution: tetrahydrofuran solution having a sample concentration of 1.0 mass %
solution injection volume: 20.0 μL
detector: differential refractometer
standard material: standard polystyrene (Agilent EasiCal™ PS-1 manufactured by Agilent Technologies, Inc.) (8 points of molecular weight: 2698000, 597500, 290300, 133500, 70500, 30230, 9590 and 2970)

If the weight average molecular weight measured based on the above conditions is less than 10000, the columns and the standard material are changed according to the following conditions, to measure the weight average molecular weight again.

column: one column of ACQUITY™ APC XT125A manufactured by Waters Corporation (gel particle size: 2.5 μm, column size (inner diameter×length): 4.6 mm×150 mm); and two columns of ACQUITY™ APC XT45A manufactured by Waters Corporation (gel particle size: 1.7 μm, column size (inner diameter×length): 4.6 mm×150 mm), connected in series in order from the upstream side standard material: standard polystyrene (Agilent EasiCal™ PS-1 manufactured by Agilent Technologies, Inc.) (10 points of molecular weight 30230, 9590, 2970, 890, 786, 682, 578, 474, 370 and 266)

<(A) Lubricating Base Oil>

A lubricating oil composition for an internal combustion engine according to the present invention (hereinafter may be simply referred to as "lubricating oil composition" or "composition") comprises a lubricating base oil of a major amount, and at least one additive other than the base oil. In the lubricating oil composition according to the present invention, a lubricating base oil comprising at least one mineral base oil or at least one synthetic base oil or any combination thereof, and having a kinematic viscosity at 100° C. of 3.8 to 4.6 mm$^2$/s (hereinafter may be referred to as "component (A)") is used as the lubricating base oil.

At least one mineral base oil, at least one synthetic base oil, or any mixed base oil thereof may be used as the lubricating base oil. In one embodiment, as the lubricating base oil, a Group I base oil (hereinafter may be referred to as "API Group I base oil"), a Group II base oil (hereinafter may be referred to as "API Group II base oil"), a Group III base oil (hereinafter may be referred to as "API Group III base oil"), a Group IV base oil (hereinafter may be referred to as "API Group IV base oil"), or a Group V base oil of API base stock categories (hereinafter may be referred to as "API Group V base oil"), or a mixed base oil thereof may be used. API Group I base oils are mineral base oils containing more than 0.03 mass % sulfur and less than 90 mass % saturates, and having a viscosity index of no less than 80 and less than 120. API Group II base oils are mineral base oils containing no more than 003 mass % sulfur and no less than 90 mass % saturates, and having a viscosity index of no less than 80 and less than 120. API Group III base oils are mineral base oils containing no more than 0.03 mass % sulfur and no less than 90 mass % saturates, and having a viscosity index of no less than 120. API Group IV base oils are poly-α-olefin base oils. API Group V base oils are base oils other than the Groups I to IV base oils, and preferred examples thereof are ester base oils. In the present specification, a viscosity index means a viscosity index measured conforming to JIS K 2283-1993. In the present specification, "sulfur content in the lubricating base oil" shall be measured conforming to JIS K 2541-2003. In the present specification, "saturated content in the lubricating base oil" means a value measured conforming to ASTM D 2007-93.

In one embodiment, as the component (A), at least one API Group II base oil, or at least one API Group III base oil, or at least one API Group IV base oil, or any combination thereof may be preferably used; and at least one API Group III base oil, or at least one API Group IV base oil, or any combination thereof may be more preferably used.

Examples of the mineral base oil include paraffinic mineral oils, normal-paraffinic mineral base oils or isoparaffinic mineral base oils which are obtained by refining lubricating oil fractions that are obtained by distillation under atmospheric pressure and/or distillation under reduced pressure of crude oil, through a refining process including solvent deasphalting, solvent extraction, hydrocracking, solvent dewaxing, catalytic dewaxing, hydrorefining, sulfuric acid washing, or white clay treatment, or the like, or any combination thereof, and any mixtures thereof.

Preferred examples of the mineral base oil include base oils obtained by (i) refining a raw material base oil of any one of the following (1) to (8) and/or lubricating oil fractions recovered from the raw material base oil, by a predetermined refining method, and then (ii) recovering lubricating oil fractions therefrom:

(1) a distillate obtained by atmospheric distillation of a paraffin base crude oil and/or a mixed base crude oil;
(2) a distillate (WVGO) obtained by vacuum distillation of residue of atmospheric distillation of a paraffin base crude oil and/or a mixed base crude oil;
(3) a wax (slack wax or the like) obtained through a lubricating oil dewaxing step and/or a synthetic wax (FT wax, gas-to-liquid (GTL) wax, or the like) obtained through a Fischer-Tropsch (FT) process or the like;
(4) at least one base oil selected from the base oils (1) to (3), or a mixed oil of at least two selected from the base oils (1) to (3), or a mild hydrocracked oil thereof or a mixed oil thereof;
(5) a mixed oil of at least two selected from the base oils (1) to (4);
(6) a deasphalted oil (DAO) of the base oil (1), (2), (3), (4) or (5);
(7) a mild hydrocracked oil (MHC) of the base oil (6); and
(8) a mixed oil of at least two selected from the base oils (1) to (7).

Preferred examples of the above described predetermined refining method include: hydrorefining such as hydrocracking and hydrofinishing; solvent refining such as furfural solvent extraction; dewaxing such as solvent dewaxing and catalytic dewaxing; white clay treatment using acid white clay, activated white clay, or the like; and chemical (acid or alkali) washing such as sulfuric acid washing and caustic soda washing. One of these refining methods may be used alone, or at least two of them may be used in combination. When at least two of the refining methods are used in combination, the order of using them is not specifically restricted, but may be suitably determined.

The following base oil (9) or (10) is especially preferable as the mineral base oil. The base oil (9) or (10) is obtained through a predetermined process on a base oil selected from the base oils (1) to (8), or on lubricating oil fractions recovered from the selected base oil:

(9) a hydrocracked base oil obtained by: hydrocracking a base oil selected from the base oils (1) to (8) or lubricating oil fractions recovered from the selected base oil; dewaxing the hydrocracked product or lubricating oil fractions recovered therefrom by distillation or the like, through a dewaxing process such as solvent dewaxing and catalytic dewaxing; and optionally further distilling the dewaxed product; and
(10) a hydroisomerized base oil obtained by: hydroisomerizing a base oil selected from the base oils (1) to (8) or lubricating oil fractions recovered from the selected base oil; carrying out a dewaxing process such as solvent dewaxing and catalytic dewaxing on the hydroisomerized product or lubricating oil fractions recovered therefrom by distillation or the like; and optionally further distilling the dewaxed product. A base oil produced via catalytic dewaxing as the dewaxing process is preferable.

When the lubricating base oil (9) or (10) is obtained, a solvent refining process and/or hydrofinishing process may be further performed at a proper stage if necessary.

A catalyst used for the above described hydrocracking or hydroisomerization is not specifically restricted. Preferred examples thereof include a hydrocracking catalyst including metal having a hydrogenating ability (such as at least one metal of the group Via and group VIII of the periodic table) supported on a catalyst support, the catalyst support including at least one composite oxide having a cracking activity (such as silica-alumina, alumina-boria and silica-zirconia) and optionally further including a binder binding the at least one composite oxide; and a hydroisomerization catalyst including metal having a hydrogenation ability including at least one group VIII metal, the metal being supported on a catalyst support, the catalyst support including a zeolite (such as ZSM-5, zeolite beta, and SAPO-11). The hydrocracking catalyst and the hydroisomerization catalyst may be used in combination by stacking, mixing, or the like.

The reaction conditions upon hydrocracking or hydroisomerization are not specifically restricted. Preferably, the hydrogen partial pressure is 0.1 to 20 MPa, the average reaction temperature is 150 to 450° C., LHSV is 0.1 to 3.0 hr$^{-1}$, and the hydrogen/oil ratio is 50 to 20000 scf/b.

The % $C_P$ of the mineral base oil is preferably no less than 70 and more preferably no less than 75 in view of improvement of viscosity-temperature characteristics of the composition and fuel efficiency. This % $C_P$ is preferably no more than 99, more preferably no more than 95, and further preferably no more than 94 in view of improvement of solubility of additives and in view of further suppression of degradation of low-temperature fluidity when the composition is contaminated with water. In one embodiment, this % $C_P$ may be 70 to 99, or 70 to 95, or 75 to 95, or 75 to 94.

The % $C_A$ of the mineral base oil is preferably no more than 2, more preferably no more than 1, further preferably no more than 0.8, and especially preferably no more than 0.5 in view of improvement of viscosity-temperature characteristics of the composition and fuel efficiency.

The % $C_N$ of the mineral base oil is preferably no less than 1 and more preferably no less than 4 in view of improvement of solubility of additives and in view of further suppression of degradation of low-temperature fluidity when the composition is contaminated with water. This % $C_N$ is preferably no more than 30 and more preferably no more than 25 in view of improvement of viscosity-temperature characteristics of the composition and fuel efficiency. In one embodiment, this % $C_N$ may be 1 to 30, or 4 to 25.

In the present specification, % $C_P$, % $C_N$ and % $C_A$ mean a percentage of the paraffinic carbons to the total carbons, a percentage of the naphthenic carbons to the total carbons, and a percentage of the aromatic carbons to the total carbons, respectively, obtained by the method conforming to ASTM D 3238-85 (ring analysis by the n-d-M method). That is, the above described preferred ranges of the % $C_P$, % $C_N$ and % $C_A$ are based on values obtained according to the above method. For example, the value of the % $C_N$ obtained according to the above method may be more than 0 even if the lubricating base oil does not include the naphthene content.

The saturated content in the mineral base oil is preferably no less than 90 mass %, more preferably no less than 95 mass %, and further preferably no less than 99 mass % on the basis of the total mass of the base oil in view of improvement of viscosity-temperature characteristics of the composition. In the present specification, the saturated content means a value measured conforming to ASTM D 2007-93.

Any similar method according to which the same results are obtained may be used for the separation method for the saturated content. Examples thereof include the method specified in the above ASTM D 2007-93, the method specified in ASTM D 2425-93, the method specified in ASTM D 2549-91, any method using high performance liquid chromatography (HPLC), and improved methods thereof.

The aromatic content in the mineral base oil is preferably 0 to 10 mass %, more preferably 0 to 5 mass %, and especially preferably 0 to 1 mass %, and in one embodiment, may be no less than 0.1 mass %, on the basis of the total mass of the base oil. The aromatic content at this upper limit or below can improve low-temperature viscosity characteristics and viscosity-temperature characteristics when the composition is fresh, can further improve fuel efficiency, and can further reduce the evaporation loss of the lubricating oil to further reduce the consumption of the lubricating oil; and can sufficiently bring out an effect of an additive when the additive is incorporated to the lubricating base oil. The lubricating base oil may contain no aromatic content. The aromatic content at the above described lower limit or over however can further improve solubility of additives.

In the present specification, the aromatic content represents a value measured conforming to ASTM D 2007-93. Aromatic content usually includes alkylbenzenes, and alkylnaphthalenes; anthracenes, phenanthrenes and alkylated compounds thereof; compounds having four or more fused benzene rings; and aromatic compounds each having a heteroatom, such as pyridines, quinolines, phenols and naphthols.

Examples of the synthetic base oil include synthetic base oils such as: poly α-olefins and hydrogenated products thereof, isobutene oligomers and hydrogenated products thereof, isoparaffins, alkylbenzenes, alkylnaphthalenes, diesters (such as ditridecyl glutarate, bis-2-ethylhexyl adipate, diisodecyl adipate, ditridecyl adipate, and bis-2-ethylhexyl sebacate), polyol esters (such as trimethylolpropane caprylate, trimethylolpropane pelargonate, pentaerythritol 2-ethylhexanoate, and pentaerythritol pelargonate), polyoxyalkylene glycols, dialkyl diphenyl ethers, polyphenyl ethers, and any mixtures thereof. Among them, a poly α-olefin base oil is preferable. Typical examples of poly α-olefin base oils include oligomers and co-oligomers of α-olefins having a carbon number of 2-32, preferably 6-16 (such as 1-octene oligomers, decene oligomers, and ethylene-propylene co-oligomers), and hydrogenated products thereof.

The method for producing a poly α-olefin is not specifically restricted. An example thereof is polymerizing an α-olefin in the presence of a polymerization catalyst such as a catalyst containing a complex of aluminum trichloride or boron trifluoride, and water, an alcohol (such as ethanol, propanol, and butanol), a carboxylic acid or an ester.

The kinematic viscosity of the lubricating base oil (total base oil) at 100° C. is no less than 3.6 mm$^2$/s and preferably no less than 3.8 mm$^2$/s in view of improvement of anti-wear performance and anti-seizure performance and in view of suppression of the evaporation loss of the lubricating oil composition to reduce the consumption of the lubricating oil. This kinematic viscosity is no more than 4.6 mm$^2$/s and preferably no more than 4.4 mm$^2$/s in view of suppression of degradation of low-temperature fluidity when the composition is contaminated with water and in view of improvement of fuel efficiency. In one embodiment, this kinematic viscosity may be 3.6 to 4.6 mm$^2$/s, or 3.6 to 4.4 mm$^2$/s, or 3.8 to 4.4 mm$^2$/s.

The kinematic viscosity of the lubricating base oil (total base oil) at 40° C. is no less than 16.0 mm$^2$/s, more preferably no less than 16.3 mm$^2$/s, further preferably no less than 16.6 mm$^2$/s, and particularly preferably no less than 16.9 mm$^2$/s in view of improvement of anti-wear performance and anti-seizure performance and in view of suppression of the evaporation loss of the lubricating oil composition to reduce the consumption of the lubricating oil. This kinematic viscosity is no more than 25.0 mm$^2$/s, more preferably no more than 23.0 mm$^2$/s, further preferably no more than 22.0 mm$^2$/s, and particularly preferably no more than 21.0 mm$^2$/s in view of improvement of fuel efficiency, and low-temperature viscosity characteristics when the composition is a fresh oil, and in view of further suppression of degradation of low-temperature fluidity when the composition is contaminated with water. In one embodiment, this kinematic viscosity may be 16.0 to 25.0 mm$^2$/s, or 16.3 to 23.0 mm$^2$/s, or 16.6 to 22.0 mm$^2$/s, or 16.9 to 21.0 mm$^2$/s. In the present specification, "kinematic viscosity at 40° C." means a kinematic viscosity at 40° C. specified in ASTM D-445.

The viscosity index of the lubricating base oil (total base oil) is preferably no less than 100, more preferably no less than 105, further preferably no less than 110, particularly preferably no less than 115, and most preferably no less than 120 in view of improvement of viscosity-temperature characteristics of the composition, anti-wear performance, and fuel efficiency, in view of suppression of the evaporation loss of the composition to reduce the consumption of the lubricating oil, and in view of further suppression of degradation of low-temperature fluidity when the composition is contaminated with water. In the present specification, a viscosity index means a viscosity index measured conforming to JIS K 2283-2000.

The pour point of the lubricating base oil (total base oil) is preferably no more than −10° C., more preferably no more than −12.5° C., and further preferably no more than −15° C. The pour point at this upper limit or below can improve low-temperature fluidity of the entire lubricating oil composition when the composition is a fresh oil. A pour point in the present specification means a pour point measured conforming to JIS K 2269-1987.

The sulfur content in the base oil depends on the sulfur content in the raw material thereof. For example, if a raw material that is substantially sulfur free, such as a synthetic wax component obtained through Fischer-Tropsch reaction or the like, is used, a base oil that is substantially sulfur free can be obtained. If a raw material containing sulfur, such as slack wax obtained through the process of refining the base oil, and microwax obtained through a wax refining process, is used, the sulfur content in the obtained base oil is usually no less than 100 mass ppm. In view of decrease in the sulfur content of the lubricating oil composition, the sulfur content of the lubricating base oil (total base oil) is preferably no more than 100 mass ppm, more preferably no more than 50 mass ppm, further preferably no more than 10 mass ppm, and especially preferably no more than 5 mass ppm. In the present specification, "sulfur content" in the base oil shall be measured conforming to JIS K 2541-2003.

The nitrogen content in the lubricating base oil (total base oil) is preferably no more than 10 mass ppm, more preferably no more than 5 mass ppm, and further preferably no more than 3 mass ppm. In the present specification, the nitrogen content means a nitrogen content measured conforming to JIS K 2609-1998.

The lubricating base oil may comprise a single base oil component or may comprise a plurality of base oil components as long as the kinematic viscosity of the entire base oil (total base oil) at 100° C. is 3.8 to 4.6 mm²/s.

The content of the lubricating base oil (total base oil) in the lubricating oil composition is usually 75 to 95 mass %, and preferably 85 to 95 mass %, on the basis of the total mass of the composition.

<(B): Metallic Detergent>

The lubricating oil composition according to the present invention comprises a metallic detergent comprising at least one metal salicylate detergent (hereinafter may be referred to as "component (B)"), wherein the component (B) is present in an amount of 1000 to 2000 mass ppm in terms of metal content on the basis of the total mass of the composition, and wherein the component (B) is present in an amount of no less than 10 mmol/kg in terms of total molar amount of any salicylate soap base per kilogram of the composition. Examples of the metallic detergent include salicylate detergents, sulfonate detergents and phenate detergents. The component (B) may comprise only one metallic detergent, and may comprise at least two metallic detergents.

Preferred examples of salicylate detergents include metal salicylates, and basic or overbased salts thereof. Preferred examples of metal salicylates include alkali or alkaline earth metal salicylates represented by the following formula (1).

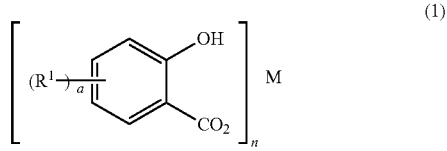

(1)

In the general formula (1), $R^1$ each independently represent a $C_{14-30}$ alkyl or alkenyl group; M represents an alkali metal or alkaline earth metal; a represents 1 or 2; and n represents 1 or 2, corresponding to the valence of M. When M is an alkali metal, n is 1; and when M is an alkaline earth metal, n is 2.

Sodium or potassium is preferable as the alkali metal. Calcium or magnesium is preferable as the alkaline earth metal. As a, 1 is preferable. When a=2, $R^1$ may be a combination of different groups.

One preferred form of salicylate detergents is an alkaline earth metal salicylate of the general formula (1) wherein a=1, or a basic or overbased salt thereof.

The method for producing alkali or alkaline earth metal salicylate is not particularly limited. For example, any known method for producing monoalkylsalicylates may be used. For example, the alkali or alkaline earth metal salicylate can be obtained by: making a metal base such as an oxide and hydroxide of an alkali or alkaline earth metal react with monoalkylsalicylic acid obtained by alkylating a phenol as starting material with an olefin, and then carboxylating the resultant product with carbonic acid gas or the like, monoalkylsalicylic acid obtained by alkylating a salicylic acid as starting material with an equivalent of the olefin, or the like. The alkaline earth metal salicylate can be obtained by: once converting the above monoalkylsalicylic acid or the like to an alkali metal salt such as a sodium salt and a potassium salt, and then performing transmetallation with an alkaline earth metal salt; or the like.

Preferred examples of sulfonate detergents include alkali or alkaline earth metal salts of alkyl aromatic sulfonic acids obtained by sulfonation of an alkylaromatic, and basic or overbased salts thereof. More preferred examples of sulfonate detergents include alkaline earth metal salts of alkyl aromatic sulfonic acids obtained by sulfonation of an alkylaromatic, and basic or overbased salts thereof. The weight average molecular weight of the alkylaromatic is preferably 400 to 1500, and more preferably 700 to 1300.

Sodium or potassium is preferable as the alkali metal. Calcium or magnesium is preferable as the alkaline earth metal. Examples of alkyl aromatic sulfonic acids include what is called petroleum sulfonic acids and synthetic sulfonic acids. Examples of petroleum sulfonic acids here include sulfonated products of alkylaromatics of lubricating oil fractions derived from mineral oils, and what is called mahogany acid, which is a side product of white oils. One example of synthetic sulfonic acids is a sulfonated product of an alkylbenzene having a linear or branched alkyl group, obtained by recovering side products in a manufacturing plant of alkylbenzenes, which are raw materials of detergents, or by alkylating benzene with a polyolefin. Another example of synthetic sulfonic acids is a sulfonated product of an alkylnaphthalene such as dinonylnaphthalene. A sulfonating agent used when sulfonating these alkylaromatics is not specifically limited, and for example, a fuming sulfuric acid or a sulfuric anhydride may be used.

Preferred examples of phenate detergents include overbased salts of alkali or alkaline earth metal salts of compounds having structures represented by the following general formula (2). More preferred examples of phenate detergents include overbased salts of alkaline earth metal salts of compounds having structures represented by the following general formula (2). Sodium or potassium is preferable as the alkali metal. Calcium or magnesium is preferable as the alkaline earth metal.

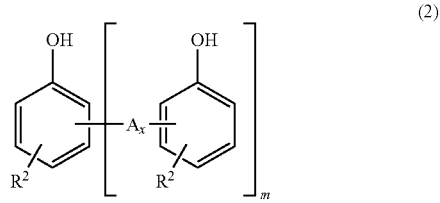

(2)

In the general formula (2), $R^2$ is a $C_{6-21}$ linear or branched chain, saturated or unsaturated alkyl or alkenyl group; m represents a polymerization degree, and is an integer of 1 to 10; A is a sulfide (—S—) group or a methylene (—CH$_2$—) group; and x is an integer of 1 to 3. $R^2$ may be a combination of at least two different groups.

The carbon number of $R^2$ in the general formula (2) is preferably no less than 9 in view of improvement of solubility in the base oil. This carbon number is preferably no more than 18 and more preferably no more than 15 in view of producibility. In one embodiment, this carbon number may be 9 to 18, or 9 to 15.

The polymerization degree m in the general formula (2) is preferably 1 to 4.

The metallic detergent may be carbonate salt- (such as alkali metal carbonate salt, e.g., sodium carbonate and potassium carbonate, and alkaline earth metal carbonate salt, e.g., calcium carbonate and magnesium carbonate) overbased, or may be borate salt- (such as alkali metal borate salt, e.g., sodium borate and potassium borate, and alkaline earth metal borate salt, e.g., calcium borate and magnesium borate) overbased.

The method for obtaining alkali or alkaline earth metal carbonate salt-overbased metallic detergent is not specifically limited. For example, such a metallic detergent can be obtained by reacting a neutral salt of a metallic detergent (such as an alkali or alkaline earth metal phenate, an alkali or alkaline earth metal sulfonate, and an alkali or alkaline earth metal salicylate) with a base of an alkali or alkaline earth metal (such as a hydroxide and an oxide of an alkali or alkaline earth metal) in the presence of carbonic acid gas.

The method for obtaining alkali or alkaline earth metal borate salt-overbased metallic detergent is not specifically limited. Such a metallic detergent can be obtained by reacting a neutral salt of a metallic detergent (such as an alkali or alkaline earth metal phenate, an alkali or alkaline earth metal sulfonate, and an alkali or alkaline earth metal salicylate) with a base of an alkali or alkaline earth metal (such as a hydroxide and an oxide of an alkali or alkaline earth metal) in the presence of a boric acid or a boric acid anhydride and optionally a borate salt. Boric acid may be orthoboric acid, or condensed boric acid (such as diboric acid, triboric acid, tetraboric acid, and metaboric acid). As a borate salt, a sodium salt of such boric acid (when a borate salt-overbased sodium detergent is obtained), a potassium salt thereof (when a borate salt-overbased potassium detergent is obtained), a calcium salt thereof (when a borate salt-overbased calcium detergent is obtained), or a magnesium salt thereof (when a borate salt-overbased magnesium detergent is obtained) may be preferably used. The borate salt may be a neutral salt, or an acidic salt. One type of the boric acid and/or borate salt may be used alone, or two or more thereof may be used in combination.

The component (B) comprises at least one metal salicylate detergent, preferably at least one alkaline earth metal salicylate detergent, and more preferably at least one calcium or magnesium salicylate detergent. The component (B) preferably comprises at least one overbased calcium or magnesium salicylate detergent. The overbased calcium salicylate detergent may be calcium carbonate-overbased, or may be calcium borate-overbased. The overbased magnesium salicylate detergent may be magnesium carbonate-overbased, or may be magnesium borate-overbased. In one embodiment, the component (B) may further comprise an alkali or alkaline earth metal sulfonate detergent, or an alkali or alkaline earth metal phenate detergent, or any combination thereof, in addition to the metal salicylate detergent. In one embodiment, the component (B) may further comprise a calcium or magnesium sulfonate detergent, or a calcium or magnesium phenate detergent, or any combination thereof, in addition to at least one metal salicylate detergent. In view of further suppression of degradation of low-temperature fluidity when the composition is contaminated with water, the total salicylate soap base of the component (B) is preferably 50 to 100 mol %, more preferably 60 to 100 mol %, further preferably 70 to 100 mol %, and particularly preferably 80 to 100 mol % of the total soap base of the component (B) in terms of total molar amount (mol) of any salicylate soap base of the component (B) of that of any soap base of the component (B). In one embodiment, this total salicylate soap base may be 90 to 100 mol % thereof. From the same viewpoint, the proportion of the total mass of any soap base of the salicylate detergent in terms of organic acid to the total mass of any soap base of the component (B) in terms of organic acid is preferably 50 to 100 mass %, more preferably 60 to 100 mass %, further preferably 70 to 100 mass %, and particularly preferably 80 to 100 mass %. In one embodiment, this proportion may be 90 to 100 mass %. Generally, in the field of lubricating oils, an organic acid metal base that can form a micelle in a base oil (such as alkali or alkaline earth metal alkylsalicylates, alkali or alkaline earth metal alkylbenzene sulfonates, and alkali or alkaline earth metal alkylphenates), or a mixture of such an organic acid metal base and a basic metal salt (such as hydroxides, carbonates and borates of an alkali or alkaline earth metal which constitutes such an organic acid metal base) is used as a metallic detergent. Such an organic acid usually has at least one polar group (such as a carboxy group, a sulfo group, and a phenolic hydroxy group) having Broensted acidity such that it can form a salt with a metal base (typically a metal oxide and/or metal hydroxide), and at least one lipophilic group such as linear or branched chain alkyl groups (examples thereof include linear or branched chain alkyl groups having 6 or more carbons), in its molecule. The soap base of the metallic detergent means a conjugate base of an organic acid which constitutes the soap content of the metallic detergent (examples thereof in the salicylate detergent include alkylsalicylate anions, examples thereof in the sulfonate detergent include alkylbenzenesulfonate anions, and examples thereof in the phenate detergent include alkylphenate anions). The molar amount of the soap base of the metallic detergent means the same as the total amount of the negative charges of this soap base. For example, in a metal salicylate represented by the general formula (1), the total amount of the negative charges per mole of the salicylate soap base is 1 mol. For example, in a metal alkylbenzenesulfonate, the total amount of the negative charges per mole of the sulfonate soap base is 1 mol. For example, in a metal alkylphenate, the total amount of the negative charges per mole of the phenate soap base is 1 mol. For example, a phenol compound represented by the general formula (2) has m+1 phenolic hydroxy groups having Broensted acidity such that it can form a salt with a metal base (typically a metal oxide and/or metal hydroxide), in its molecule. When these phenolic hydroxy groups all form metal salts, the total amount of the negative charges thereof is m+1 per molecule of the compound of the general formula (2).

The metal content in the component (B) may be, for example, 1.0 to 20 mass %, and preferably 5.0 to 14 mass %.

The base number of the metal salicylate detergent may be, for example, preferably 150 to 350 mgKOH/g, more preferably 200 to 350 mgKOH/g, and particularly preferably 220 to 350 mgKOH/g. The base number of the metal sulfonate detergent may be, for example, 200 to 500 mgKOH/g, or 300 to 500 mgKOH/g, or 300 to 420 mgKOH/g. The base number of the metal phenate detergent may be, for example, 140 to 420 mgKOH/g, or 250 to 420 mgKOH/g, or 250 to 330 mgKOH/g. The base number in the present specification means a base number measured by the perchloric acid method conforming to TIS K2501. Generally, a metallic detergent is obtained by reaction in a diluent such as a solvent and a lubricating base oil. Therefore, a metallic detergent is on the market as diluted in a diluent such as a lubricating base oil. In the present specification, the base number of a metallic detergent shall mean a base number as a diluent is contained. In the present specification, the metal content of a metallic detergent shall mean metal content as a diluent is contained.

The metal ratio of the metal salicylate detergent is preferably no less than 1.3, more preferably no less than 1.5, further preferably no less than 1.7, and particularly preferably no less than 2.5 in view of improvement of detergency and base number retention. This metal ratio is preferably no more than 7.0, more preferably no more than 5.5, and further preferably no more than 4.0 in view of suppression of the ash content of the composition and in view of improvement of the lifetime of an exhaust gas post treatment system. In one embodiment, this metal ratio may be 1.3 to 7.0, or 1.5 to 7.0, or 1.7 to 5.5, or 2.5 to 4.0. From the same viewpoint, the metal ratio of the metal sulfonate detergent is preferably no less than 9.0, or no less than 11.0, or no less than 13.5; and is preferably no more than 35.0, or no more than 32.5, or no more than 28.0; and in one embodiment, may be 9.0 to 35.0, or 11.0 to 32.5, or 13.5 to 28.0. From the same viewpoint, the metal ratio of the metal phenate detergent is preferably no less than 1.0, or no less than 2.0, or no less than 2.5; and is preferably no more than 20, or no more than 15, or no more than 10; and in one embodiment, may be 1.0 to 20, or 2.0 to 15, or 2.5 to 10.

In the present specification, the metal ratio of the metallic detergent is defined as 1 when the metallic detergent is a complete neutral salt, and is calculated according to the following formula:

the metal ratio=the total amount (mol) of the positive charges of any metal ions of the metallic detergent/the total amount (mol) of the negative charges of any soap base of the metallic detergent.

For example, the amount of the positive charges per mole of an alkali metal ion is 1 mol, and the amount of the positive charges per mole of an alkaline earth metal ion is 2 mol. The amount of the negative charges of the soap base is as described above.

The content of the component (B) in the lubricating oil composition on the basis of the total mass of the composition in terms of metal content is no less than 1000 mass ppm, and preferably no less than 1100 mass ppm in view of improvement of detergency and base number retention. In one embodiment, this content is no less than 1200 mass ppm. This content is no more than 2000 mass ppm and preferably no more than 1900 mass ppm in view of suppression of the increase of the ash content in the composition and in view of improvement of the lifetime of an exhaust gas post treatment system. This content is, in one embodiment, no more than 1800 mass ppm. In one embodiment, this content may be 1000 to 2000 mass ppm, or 1100 to 1900 mass ppm, or 1200 to 1800 mass ppm.

The content of the component (B) in the lubricating oil composition in terms of total molar amount of any salicylate soap base per kilogram of the composition is no less than 10 mmol/kg, preferably no less than 15 mmol/kg, and in one embodiment, no less than 18 mmol/kg in view of improvement of base number retention and in view of suppression of degradation of low-temperature fluidity when the composition is contaminated with water. This content is preferably no more than 70 mmol/kg, more preferably no more than 60 mmol/kg, and in one embodiment, no more than 50 mmol/kg in view of suppression of sludge. In one embodiment, this content may be 10 to 70 mmol/kg, or 15 to 60 mmol/kg, or 18 to 50 mmol/kg. In the present specification, the unit "mmol" means $10^{-3}$ mol.

The content of the component (B) in the lubricating oil composition in terms of total molar amount of any soap base per kilogram of the composition is preferably no less than 15 mmol/kg, more preferably no less than 17 mmol/kg, and in one embodiment, no less than 18 mmol/kg in view of improvement of base number retention and in view of further suppression of degradation of low-temperature fluidity when the composition is contaminated with water. This content is preferably no more than 70 mmol/kg, more preferably no more than 60 mmol/kg, and in one embodiment, no more than 50 mmol/kg in view of suppression of sludge. In one embodiment, this content may be 15 to 70 mmol/kg, or 15 to 60 mmol/kg, or 18 to 50 mmol/kg.

<(C) Comb-Shaped Poly(Meth)Acrylate>

The lubricating oil composition according to the present invention comprises at least one comb-shaped poly(meth)acrylate (hereinafter may be referred to as "component (C)") in an amount of 1.0 to 4.0 mass % in terms of resin content on the basis of the total mass of the composition, the comb-shaped poly(meth)acrylate having a weight average molecular weight of 350,000 to 1,000,000 and a polydispersity index of no more than 4.0. The comb-shaped poly(meth)acrylate may be a non-dispersant poly(meth)acrylate, or may be a dispersant poly(meth)acrylate, or may be a combination thereof.

As a poly(meth)acrylate compound constituting the component (C), for example, a poly(meth)acrylate compound comprising a monomer unit represented by the following general formula (3) in an amount of no less than mol % on the basis of the total monomer units in the polymer (hereinafter may be referred to as "poly(meth)acrylate (C1)" or "component (C1)") may be preferably employed.

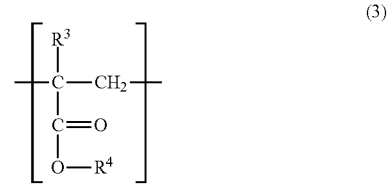

(3)

(In the general formula (3), $R^3$ is hydrogen or a methyl group, and $R^4$ is a $C_{1-5}$ linear or branched chain hydrocarbon group, preferably alkyl group.)

In the poly(meth)acrylate (C1), the proportion of any (meth)acrylate monomer unit represented by the general formula (3) in the polymer is preferably no less than 10 mol %, more preferably no less than 20 mol, further preferably no less than 30 mol %, and particularly preferably no less than 40 mol % in view of enhancement of the effect of improving viscosity-temperature characteristics. This proportion is preferably no more than 90 mol %, more preferably no more than 80 mol %, and further preferably no more than 70 mol % in view of improvement of solubility in the base oil, enhancement of the effect of improving viscosity-temperature characteristics, and improvement of low-temperature viscosity characteristics when the composition is a fresh oil. In one embodiment, this proportion may be 10 to 90 mol %, or 20 to 90 mol %, or 30 to 80 mol %, or 40 to 70 mol %.

A viscosity index improver according to the present embodiment may comprise only a (meth)acrylate monomer unit represented by the general formula (3), or may be a copolymer comprising another (meth)acrylate monomer unit in addition to a (meth)acrylate monomer unit represented by the general formula (3). Such a copolymer can be obtained by copolymerizing at least one monomer represented by the following general formula (4) (hereinafter may be referred to as "monomer (M-1)"), and at least one monomer other than the monomer (M-1).

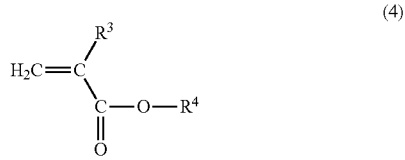

(4)

(In the general formula (4), $R^3$ represents hydrogen or a methyl group, and $R^4$ represents a linear or branched chain $C_1$-5 hydrocarbon group, preferably alkyl group.)

A monomer copolymerized with the monomer (M-1) is not particularly limited. Preferred examples thereof include at least one monomer represented by the following general formula (5) (hereinafter may be referred to as "monomer (M-2)"), or at least one monomer represented by the following general formula (6) (hereinafter may be referred to as "monomer (M-3)"), or any combination thereof. A copolymer of the monomer (M-1) and the monomer (M-2) and/or the monomer (M3) is a so-called non-dispersant poly(meth)acrylate.

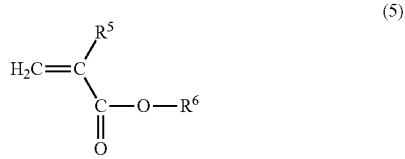

(5)

(In the general formula (5), $R^5$ represents a hydrogen atom or a methyl group, and $R^6$ represents a linear or branched chain $C_{6-18}$ hydrocarbon group, preferably alkyl group.)

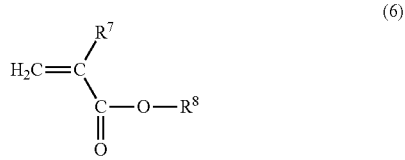

(6)

(In the general formula (6), $R^7$ represents a hydrogen atom or a methyl group, and $R^8$ represents a linear or branched chain hydrocarbon group having a carbon number of no less than 19, preferably alkyl group.)

$R^8$ in the monomer (M-3) represented by the general formula (6) is a linear or branched chain hydrocarbon group having a carbon number of no less than 19 as described above, preferably a linear or branched chain $C_{20-50,000}$ hydrocarbon group, or a linear or branched chain $C_{22-500}$ hydrocarbon group, or a linear or branched chain $C_{24-100}$ hydrocarbon group, or a branched chain $C_{29-50}$ hydrocarbon group, or a branched chain $C_{24-40}$ hydrocarbon group.

In the poly(meth)acrylate (C1), the proportion of the monomer unit corresponding to the monomer (M-2) represented by the general formula (5) to the total monomer units in the polymer is preferably no less than 3 mol %, more preferably no less than 5 mol, further preferably no less than 10 mol %, and particularly preferably no less than 15 mol % in view of enhancement of the effect of improving viscosity-temperature characteristics. This proportion is preferably no more than 75 mol %, more preferably no more than 65 mol %, further preferably no more than 55 mol %, particularly preferably no more than mol %, and in one embodiment, no more than 35 mol % in view of improvement of solubility in the base oil, enhancement of the effect of improving viscosity-temperature characteristics, and improvement of low-temperature viscosity characteristics when the composition is a fresh oil. In one embodiment, this proportion may be 3 to 75 mol %, or 5 to 65 mol %, or 10 to 55 mol %, or 15 to 45 mol %, or 15 to 35 mol %.

In the poly(meth)acrylate (C1), the proportion of the monomer unit corresponding to the monomer (M-3) represented by the general formula (6) to the total monomer units in the polymer is preferably no less than 0.5 mol % or no less than 1 mol %, more preferably no less than 3 mol, further preferably no less than 5 mol %, and particularly preferably no less than 10 mol % in view of enhancement of the effect of improving viscosity-temperature characteristics. This proportion is preferably no more than 70 mol %, more preferably no more than 60 mol %, further preferably no more than 50 mol %, particularly preferably no more than 40 mol %, and in one embodiment, no more than 30 mol % in view of enhancement of the effect of improving viscosity-temperature characteristics, and improvement of low-temperature viscosity characteristics when the composition is a fresh oil. In one embodiment, this proportion may be 0.5 to 70 mol %, or 1 to 70 mol %, or 3 to 60 mol %, or 5 to 50 mol %, or 10 to 40 mol, or to 30 mol %.

In one embodiment, the proportion of the monomer units corresponding to the monomers (M-1), (M-2) and (M-3) to the total monomer units in the polymer may be such that monomer (M-1):monomer (M-2):monomer (M-3)=10 to 90 mol %:3 to 75 mol %:1 to 70 mol %, or 20 to 90 mol %:5 to 65 mol %:3 to 60 mol %, or 30 to 80 mol %:10 to 55 mol %:5 to 50 mol %, or 40 to 70 mol %:15 to 45 mol %:10 to 40 mol %.

At least one monomer represented by the following general formula (7) (hereinafter may be referred to as "monomer (M-4)"), or at least one monomer represented by the following general formula (8) (hereinafter may be referred to as "monomer (M-5)"), or any combination thereof is preferable as another monomer copolymerized with the monomer (M-1). A copolymer of the monomer (M-1), and any of the monomer(s) (M-2) and/or (M-3) and the monomer(s) (M-4) and/or (M-5) is a so-called dispersant poly(meth)acrylate viscosity index improver.

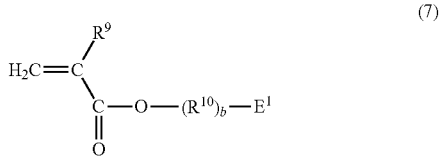

(7)

(In the general formula (7), $R^9$ represents a hydrogen atom or a methyl group, $R^{10}$ represents a $C_{1-18}$ alkylene group, $E^1$ represents an amine residue or heterocyclic residue having 1 to 2 nitrogen atom(s), and 0 to 2 oxygen atom(s), and b represents 0 or 1.)

Examples of $C_{1-18}$ alkylene groups represented by $R^{10}$ include ethylene group, propylene group, butylene group, pentylene group, hexylene group, heptylene group, octylene group, nonylene group, decylene group, undecylene group, dodecylene group, tridecylene group, tetradecylene group, pentadecylene group, hexadecylene group, heptadecylene group, and octadecylene group (each alkylene group may be a linear or branched chain).

Examples of residues represented by $E^{10}$ include dimethylamino group, diethylamino group, dipropylamino group, dibutylamino group, anilino group, toluidino group, xylidino group, acetylamino group, benzoylamino group, morpholino group, pyrrolyl group, pyrrolino group, pyridyl group, methylpyridyl group, pyrrolidinyl group, pyrrolidino group, piperidinyl group, piperidino group, quinolyl group, pyrrolidonyl group, pyrrolidono group, imidazolino group, and pyrazinyl group.

(8)

(In the general formula (8), $R^{11}$ represents a hydrogen atom or a methyl group, and $E^2$ represents an amine residue or heterocyclic residue having 1 to 2 nitrogen atom(s), and 0 to 2 oxygen atom(s).)

Examples of residues represented by $E^2$ include dimethylamino group, diethylamino group, dipropylamino group, dibutylamino group, anilino group, toluidino group, xylidino group, acetylamino group, benzoylamino group, morpholino group, pyrrolyl group, pyrrolino group, pyridyl group, methylpyridyl group, pyrrolidinyl group, pyrrolidino group piperidinyl group, piperidino group, quinolyl group, pyrrolidonyl group, pyrrolidono group, imidazolino group, and pyrazinyl group.

Preferred specific examples of the monomers (M-4) and (M-5) include dimethylaminomethyl methacrylate, diethylaminomethyl methacrylate, dimethylaminoethyl methacrylate, diethylaminoethyl methacrylate, 2-methyl-5-vinylpyridine, morpholinomethyl methacrylate, morpholinoethyl methacrylate, N-vinylpyrrolidone, and mixtures thereof.

The copolymerization ratio of any copolymer of the monomer (M-1) and the monomers (M-2) to (M-5) is not specifically restricted, but monomer (M-1):monomers (M-2) to (M-5) is preferable approximately 20:80 to 90:10 mol/mol, more preferably 30:70 to 80:20 mol/mol, and further preferably 40:60 to 70:30 mol/mol, in terms of molar amount ratio.

The method for producing the poly(meth)acrylate is not particularly limited. For example, a non-dispersant poly(meth)acrylate can be easily obtained by radical solution polymerization of at least one monomer selected from the monomers (M-1) to (M-3) in the presence of a polymerization initiator (such as benzoyl peroxide). For another example, a dispersant poly(meth)acrylate compound can be easily obtained by polymerizing at least one monomer selected from the monomers (M-1) to (M-3), and at least one nitrogen-containing monomer selected from the monomers (M-4) and (M-5) by radical solution polymerization in the presence of a polymerization initiator.

The component (C) is a comb-shaped poly(meth)acrylate. The comb-shaped polymer has a main chain and at least two side chains linked to the main chain. The main chain of the comb-shaped poly(meth)acrylate is a poly(meth)acrylate polymer chain. The side chains of the comb-shaped poly(meth)acrylate may be polymer chains other than a poly(meth)acrylate polymer chain, and may be poly(meth)acrylate polymer chains.

One preferred example of a comb-shaped poly(meth)acrylate having any poly(meth)acrylate polymer chain as side chains is the poly(meth)acrylate (C1) (hereinafter may be referred to as "comb-shaped poly(meth)acrylate (C1a)") obtainable by polymerizing a poly(meth)acrylate macromonomer (M-6) ((hereinafter may be referred to as "macromonomer (M-6)") alone, or by polymerizing the macromonomer (M-6) and at least one monomer selected from the monomers (M-1) to (M-5). The macromonomer (M-6) has a polymerizable functional group, and is obtained by polymerizing at least one monomer selected from the monomers (M-1) to (M-5), preferably at least one monomer selected from the monomers (M-1), (M-2), (M-4) and (M-5). The macromonomer (M-6) preferably has a polymerizable functional group at an end of a polymer chain.

The number average molecular weight (Mn) of the macromonomer (M-6) is preferably no less than 270, more preferably no less than 500, further preferably no less than 600, and particularly preferably no less than 700 in view of further suppression of degradation of low-temperature fluidity when the composition is contaminated with water. This number average molecular weight (Mn) is preferably no more than 200,000, more preferably no more than 100,000, further preferably no more than 50,000, and particularly preferably no more than 20,000 in view of manufacturing costs. In one embodiment, this number average molecular weight (Mn) may be 270 to 200,000, or 500 to 100,000, or 600 to 50,000, or 700 to 20,000.

Examples of the polymerizable functional group of the macromonomer (M-6) include acryloyl group, methacryloyl group, vinyl group, vinyloxy group ($CH_2$=CH—O— group), allyl group, allyloxy group ($CH_2$=CH—$CH_2$—O— group), acryloylamino group ($CH_2$=CH—CONN— group), and methacryloylamino group ($CH_2$=C($CH_3$)—CONH— group).

The content of the monomer unit corresponding to the macromonomer (M-6) in the comb-shaped poly(meth)acrylate (Cia) is preferably 30 to 100 mol %, more preferably 50 to 100 mol %, further preferably 70 to 100 mol %, and particularly preferably 90 to 100 mol % in terms of molar amount ratio on the basis of the total monomer units of the comb-shaped poly(meth)acrylate (C1a) in view of further suppression of degradation of low-temperature fluidity when the composition is contaminated with water. This content is preferably no more than 90 mol %, more preferably no more than 70 mol %, and further preferably no more than 50 mol % in view of cost reduction. In one embodiment, this content may be 30 to 100 mol %, or 50 to 100 mol %, or 70 to 100 mol %, or 90 to 100 mol %, or 30 to 90 mol %, or 30 to 70 mol %, or 30 to 50 Mol %, or 50 to 90 mol %, or 50 to 70 mol %.

One preferred example of a comb-shaped poly(meth)acrylate having any polymer other than a poly(meth)acrylate polymer chain as side chains is the poly(meth)acrylate (C1) (hereinafter may be referred to as "comb-shaped poly(meth)acrylate (C1b)") that is a copolymer of the monomers (M-1) and (M-3), and any of the monomers (M-2), (M4) and/or (M-5), where the monomer (M-3) includes a macromonomer (hereinafter may be referred to as "macromonomer (M-3a)") having $R^8$ in the general formula (6) having a number average molecular weight (Mn) of no less than 1,000. In the comb-shaped poly(meth)acrylate (C1b), $R^8$ in the macromonomer (M-3a) constitutes the side chains of the comb-shaped polymer.

In the comb-shaped poly(meth)acrylate (C1b), the number average molecular weight of $R^8$ (general formula (6)) of the macromonomer (M-3a) is no less than 1,000, preferably no less than 1,500, and more preferably no less than 2,000; and preferably no more than 50,000, more preferably no more than 20,000, and further preferably no more than 10,000; and in one embodiment, may be 1,000 to 50,000, or 1,500 to 20,000, or 2,000 to 10,000. Examples of such a macromonomer (M-3a) are macromonomers each having $R^8$ and derived from a hydrogenated product of a polyolefin obtained by copolymerizing butadiene and isoprene.

In the comb-shaped poly(meth)acrylate (C1b), the copolymerization ratio of the macromonomer (M-3a) is preferably 30 to 100 mol %, more preferably 50 to 100 mol %, further preferably 70 to 100 mol %, and particularly preferably 90 to 100 mol % in terms of molar amount ratio on the basis of the total monomer units of the poly(meth)acrylate in view of further suppression of degradation of low-temperature fluidity of the composition when contaminated with water. This copolymerization ratio is preferably no more than 90 mol %, more preferably no more than 80 mol %, further preferably no more than 60 mol %, and particularly preferably no more than 40 mol % in view of cost reduction. In one embodiment, this copolymerization ratio may be 30 to 100 mol %, or 50 to 100 mol %, or 70 to 100 mol %, or 90 to 100 mol %, or 30 to 90 mol, or 30 to 80 mol %, or 30 to 60 mol %, or 30 to 40 mol %, or 50 to 90 mol %, or 50 to 80 mol %, or 50 to 60 mol %, or 70 to 90 mol %, or 70 to 80 mol %.

The weight average molecular weight (Mw) of the component (C) is no less than 350,000, preferably no less than 380,000, and in one embodiment, more than 400,000, for example, no less than 410000 in view of suppression of degradation of low-temperature fluidity of the composition when contaminated with water. This weight average molecular weight (Mw) is no more than. 1,000,000, preferably no more than 900,000, and in one embodiment, no more than 850000, for example, no more than 800,000 in view of improvement of fuel efficiency, storage stability, and shear stability. In one embodiment, this weight average molecular weight (Mw) may be 350,000 to 1,000,000, or 380,000 to 900,000, or more than 400,000 and no more than 850,000, or 410,000 to 800,000. When the component (C) comprises a plurality of the comb-shaped poly(meth)acrylates, the weight average molecular weight of each of the comb-shaped poly(meth)acrylates is preferably within the foregoing range.

The polydispersity index (PDI) of the component (C) is no more than 4.0, preferably no more than 3.5, more preferably no more than 3.2 in one embodiment, no more than 3.1, and usually more than 1.0 in view of suppression of degradation of low-temperature fluidity of the composition when contaminated with water. This polydispersity index is preferably no less than 1.1, more preferably no less than 1.5, and in one embodiment, no less than 2.0 in view of producibility. In one embodiment, this polydispersity index may be more than 1.0 and no more than 4.0, or 1.1 to 3.5, or 1.5 to 3.2, or 2.0 to 3.1. In the present specification, the polydispersity index of the polymer means the ratio (Mw/Mn) of the weight average molecular weight (Mw) of the polymer to the number average molecular weight (Mn) thereof. When the component (C) comprises a plurality of the comb-shaped poly(meth)acrylates, the polydispersity index of each of the comb-shaped poly(meth)acrylates is preferably within the foregoing range.

The content of the component (C) in the lubricating oil composition is no less than 1.0 mass %, preferably no less than 1.2 mass %, and in one embodiment, no less than 1.4 mass % in terms of resin content on the basis of the total mass of the composition in view of suppression of degradation of low-temperature fluidity of the composition when contaminated with water. This content is no more than 4.0 mass %, preferably no more than 3.5 mass %, more preferably no more than 3.0 mass %, and in one embodiment, no more than 2.5 mass % in view of retention of the viscosity of the composition within a preferred range to improve fuel efficiency, and in view of improvement of shear stability. In one embodiment, this content may be 1.0 to 4.0 mass %, or 1.2 to 3.5 mass %, or 1.2 to 3.0 mass %, or 1.4 to 2.5 mass %. In the present specification, "resin content" means a polymer component having a weight average molecular weight of no less than 1,000.

<(D) Succinimide Dispersant>

The lubricating oil composition according to the present invention comprises a succinimide dispersant (hereinafter may be referred to as "component (D)") comprising at least one non-modified succinimide dispersant or at least one boric acid-modified succinimide dispersant or any combination thereof in an amount of 100 to 1000 mass ppm in terms of nitrogen on the basis of the total mass of the composition. The total nitrogen content derived from the non-modified succinimide dispersant and the boric acid-modified succinimide dispersant is no less than 70 mass % of the total nitrogen content of the component (D). As the succinimide dispersant, succinimide having at least one alkyl or alkenyl group in its molecule, or a modified product thereof may be used. An example of succinimide having at least one alkyl or alkenyl group in its molecule is any compound represented by the following general formula (9) or (10).

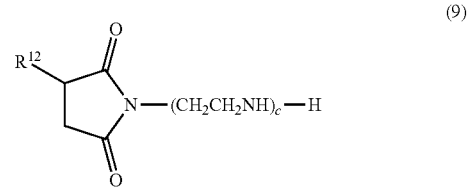

(9)

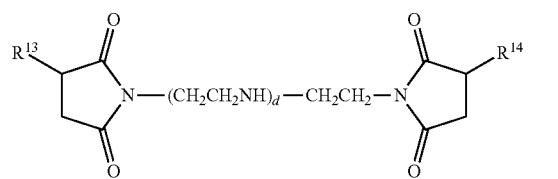

(10)

In the general formula (9), Rn represents a $C_{40-400}$ alkyl or alkenyl group, and c is an integer of 1 to 5, preferably 2 to 4. The carbon number of Ru is no less than 40 and preferably no less than 60 in view of solubility in the base oil. This carbon number is no more than 400 and preferably no more than 350 in view of low-temperature fluidity when the composition is a fresh oil. In one embodiment, this carbon number may be 40 to 400, or 60 to 350.

In the general formula (10), $R^{13}$ and $R^{14}$ each independently represent a $C_{40-400}$ alkyl or alkenyl group, and may be any combination of different groups. d is an integer of 0 to 4, preferably 1 to 4, and more preferably 1 to 3. The carbon numbers of $R^{13}$ and $R^{14}$ are each no less than 40 and preferably no less than 60 in view of solubility in the base oil. These carbon numbers are each no more than 400 and preferably no more than 350 in view of low-temperature fluidity when the composition is a fresh oil. In one embodiment, these carbon numbers may be 40 to 400, or 60 to 350.

The carbon numbers of $R^{12}$ to $R^{14}$ in the general formulae (9) and (10) at the foregoing lower limits or more make it possible to obtain good solubility in the lubricating base oil. These carbon numbers at the foregoing upper limits or less can improve low-temperature fluidity when the lubricating oil composition is a fresh oil.

The alkyl or alkenyl groups ($R^{12}$ to $R^{14}$) in the general formulae (9) and (10) may be linear chains or branched. Preferred examples thereof include branched alkyl groups and branched alkenyl groups which are derived from an oligomer of an olefin such as propylene, 1-butene and isobutene, or from co-oligomers of ethylene and propylene. Among them, a branched alkyl or alkenyl group derived from an oligomer of isobutene which is conventionally referred to as polyisobutylene, or a polybutenyl group is most preferable.

Preferred number average molecular weights of the alkyl or alkenyl groups ($R^{12}$ to $R^{14}$) in the general formulae (9) and (10) are 800 to 3500, and preferably 1000 to 3500.

The succinimide having at least one alkyl or alkenyl group in its molecule encompasses so-called mono-type succinimide such that succinic anhydride terminates only one end of the polyamine chain, which is represented by the general formula (9), and so-called bis-type succinimide such that succinic anhydride terminates both ends of the polyamine chain, which is represented by the formula (10). The lubricating oil composition may comprise either mono-type or bis-type succinimide, or may comprise both of them as a mixture. The content of bis-type succinimide or any derivative thereof in the component (D) is preferably no less than 50 mass %, and more preferably no less than 70 mass %, on the basis of the total mass (100 mass %) of the composition (D).

The method for producing the succinimide having at least one alkyl or alkenyl group in its molecule is not specifically limited. For example, such succinimide is obtainable through reaction of alkyl- or alkenyl-succinic acid having a $C_{40-400}$ alkyl or alkenyl group, or an anhydride thereof, with a polyamine, as a condensation reaction product. As the component (D), this condensation product may be used as it is (that is, non-modified succinimide), or may be converted into a modified product (derivative) described later, and used. The condensation product of alkyl- or alkenyl-succinic acid, or an anhydride thereof, and a polyamine may be bistype succinimide where both ends of the polyamine chain are imidated (see the general formula (10)), may be mono-type succinimide where only one end of the polyamine chain is imidated (see the general formula (9)), or may be a mixture thereof. Here, an alkenylsuccinic acid anhydride having a $C_{40-400}$ alkenyl group may be obtained by, for example, reaction of a $C_{40-400}$ olefin and maleic anhydride at 100 to 200° C. This alkenylsuccinic acid anhydride is further subjected to hydrogenation reaction, which makes it possible to obtain an alkylsuccinic acid anhydride having a $C_{40-400}$ alkyl group. Examples of a polyamine include diethylenetriamine, triethylenetetramine, tetraethylenepentamine, and pentaethylenehexamine, and any mixtures thereof.

A polyamine raw material comprising at least one selected from them may be preferably used. The polyamine raw material may optionally further comprise ethylenediamine. In view of improvement of the condensation product or any derivative thereof in performance thereof as a dispersant, the content of ethylenediamine in the polyamine raw material is preferably 0 to 10 mass %, and more preferably 0 to 5 mass %, on the basis of the total mass of the polyamine. Succinimide obtained as a condensation reaction product of alkyl- or alkenyl-succinic acid having a $C_{40-400}$ alkyl or alkenyl group, or an anhydride thereof, with a mixture of at least two polyamines is a mixture of compounds of the general formula (9) or (10) different in values of c or d, respectively.

Examples of a modified product (derivative) of succinimide include (i) boric acid-modified products, (ii) phosphoric acid-modified products, (iii) oxygen-containing organic compound-modified products, (iv) sulfur-modified products, and (v) modified products of at least two of them in combination.

(i) Boric acid-modified products are modified compounds (boric acid-modified succinimide) where a part or all of the residual amino groups and/or imino groups is/are neutralized or amidated by making boric acid react with the above described succinimide.

(ii) Phosphoric acid-modified products are modified compounds (phosphoric acid-modified succinimide) where a part or all of the residual amino groups and/or imino groups is/are neutralized or amidated by making the above described succinimide react with phosphoric acid.

(iii) Oxygen-containing organic compound-modified products are modified compounds (oxygen-containing organic compound-modified succinimide) where a part or all of the residual amino groups and/or imino groups is/are neutralized or amidated by making a $C_{1-30}$ monocarboxylic acid such as fatty acids, a $C_{2-30}$ polycarboxylic acid (such as ethanedioic acid, phthalic acid, trimellitic acid, and pyromellitic acid), an anhydride or ester thereof, a $C_{2-6}$ alkylene oxide, or a hydroxy(poly)oxyalkylene carbonate react with the above described succinimide.

(iv) Sulfur-modified products are modified compounds (sulfur-modified succinimide) obtained by making a sulfur compound react with the above described succinimide.

(v) Modified products of at least two of them in combination are obtained by at least two modifications selected from the boron modification, phosphoric acid modification, oxygen-containing organic compound modification, and sulfur modification, on the above described succinimide in combination.

Among these modified products (derivatives) (i) to (v), a boric acid-modified succinimide, especially a boric acid-modified product of bis-type alkenylsuccinimide may be preferably used.

The molecular weight of the component (D) is not particularly limited. A preferred weight average molecular weight thereof is 1000 to 20000, more preferably 2000 to 20000, further preferably 3000 to 15000, and particularly preferably 4000 to 9000.

The component (D) may comprise at least one non-modified succinimide dispersant only, may comprise at least one boric acid-modified succinimide dispersant only, or may comprise both of them. The component (D) may further comprise any of the above described modified succinimide except boric acid-modified products, in addition to the non-modified succinimide dispersant and/or boric acid-modified succinimide. The total nitrogen content derived from the non-modified succinimide dispersant and the boric acid-modified succinimide dispersant is 70 to 100 mass %, preferably 80 to 100 mass %, more preferably 90 to 100 mass %, and particularly preferably 95 to 100 mass % of the total nitrogen content of the component (D) in view of suppression of degradation of low-temperature fluidity of the composition when contaminated with water.

The content of the component (D) in the lubricating oil composition is preferably no less than 100 mass ppm, more preferably no less than 200 mass ppm, further preferably no less than 300 mass ppm, and particularly preferably no less than 400 mass ppm in terms of nitrogen on the basis of the total mass of the composition in view of suppression of degradation of low-temperature fluidity of the composition when contaminated with water, and in view of improvement of an anti-coking property and solubility of additives. This content is no more than 1000 mass ppm, preferably no more than 900 mass ppm, more preferably no more than 800 mass ppm, and particularly preferably no more than 700 mass ppm in view of improvement of fuel efficiency of the composition, and low-temperature fluidity when the composition is a fresh oil. In one embodiment, this content may be 100 to 1000 mass ppm, or 200 to 900 mass ppm, or 300 to 800 mass ppm, or 400 to 700 mass ppm.

The boron content in the lubricating oil composition derived from the component (D) is preferably 0 to 500 mass ppm, more preferably 0 to 400 mass ppm, further preferably 0 to 350 mass ppm, and particularly preferably 0 to 300 mass ppm on the total mass of the composition in view of improvement of fuel efficiency and in view of suppression of the ash content in the composition.

The mass ratio B/N of the total boron content B of the component (D) to the total nitrogen content N thereof is preferably 0 to 0.69, more preferably 0 to 0.62, further preferably 0 to 0.54, and particularly preferably 0 to 0.50 in view of further suppression of degradation of low-temperature fluidity of the composition when contaminated with water.

<(E) Zinc dialkyldithiophosphate>

In one preferred embodiment, the lubricating oil composition according to the present invention may further comprise a zinc dialkyldithiophosphate (ZnDTP; hereinafter may be referred to as "component (E)"). For example, any compound represented by the following general formula (11) may be used as the component (E).

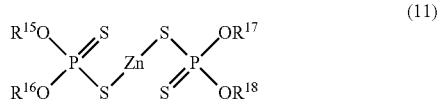

(11)

In the general formula (11), $R^{15}$ to $R^{18}$ each independently represent a $C_{1-24}$ linear or branched chain alkyl group, and may be combination of different groups. The carbon numbers of $R^{15}$ to $R^{18}$ are each preferably 3 to 12, and more preferably 3 to 8. $R^{15}$ to $R^{18}$ may be each primary, secondary, and tertiary alkyl groups, and are preferably primary or secondary alkyl groups or combination thereof. Further, the molar ratio of the primary alkyl group and the secondary alkyl group (primary alkyl group:secondary alkyl group) is preferably 0:100 to 30:70. This ratio may be the intramolecular combination ratio of alkyl chains, or may be the mixing ratio of ZnDTP having the primary alkyl group only and ZnDTP having the secondary alkyl group only. ZnDTP having the secondary alkyl group as the major constituent can further improve fuel efficiency.

The content of the component (E) in the lubricating oil composition is preferably 0 to 1000 mass ppm, more preferably 0 to 900 mass ppm, and further preferably 0 to 800 mass ppm in terms of phosphorous on the basis of the total mass of the composition in view of reduction of catalyst poisoning in an exhaust gas post treatment system. This content in terms of phosphorous is preferably no less than 400 mass ppm, more preferably no less than 500 mass ppm, and further preferably no less than 600 mass ppm in view of improvement of anti-wear performance, and suppression of preignition. In one embodiment, this content may be 700 to 800 mass ppm, or 750 to 800 mass ppm, or 770 to 800 mass ppm.

<(F) Oil-Soluble Organic Molybdenum Compound>

In one preferred embodiment, the lubricating oil composition according to the present invention may further comprise an oil-soluble organic molybdenum compound (hereinafter may be referred to as "component (F)"). The component (F) functions as a molybdenum friction modifier.

As the component (F), molybdenum dithiocarbamate (sulfurized molybdenum dithiocarbamate or sulfurized oxymolybdenum dithiocarbamate, which may be hereinafter referred to as "component (F1)") may be preferably used.

Any compound represented by the following general formula (12) may be used as the component (F1).

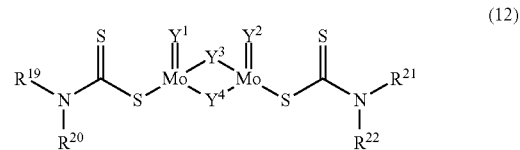

(12)

In the general formula (12), $R^{19}$ to $R^{22}$ may be the same or different, and are each a $C_{2-24}$ alkyl or $C_{6-24}$ (alkyl)aryl group, preferably a $C_{4-13}$ alkyl or $C_{10-15}$ (alkyl)aryl group. The alkyl group may be a primary, secondary, or tertiary alkyl group, and may be linear or branched. "(Alkyl)aryl group" means "aryl or alkylaryl group". In the alkylaryl group, the alkyl substituent may be in any position of the aromatic ring. $Y^1$ to $Y^4$ are each independently a sulfur atom or oxygen atom. At least one of $Y^1$ to $Y^4$ is a sulfur atom.

The content of the component (F) in the lubricating oil composition is, in terms of molybdenum on the basis of the total mass of the composition, preferably 0 to 2000 mass ppm, more preferably 0 to 1500 mass ppm, and further preferably 0 to 1200 mass ppm in view of improvement of the storage stability of the lubricating oil composition. This content in terms of molybdenum is preferably no less than 50 mass ppm, more preferably no less than 200 mass ppm, and further preferably no less than 300 mass ppm in view of improvement of fuel efficiency and suppression of preignition. In one embodiment, this content may be 50 to 2000 mass ppm, or 200 to 1500 mass ppm, or 300 to 1200 mass ppm.

<Other Additives>

Other additives commonly used in lubricating oils may be further incorporated in the lubricating oil composition according to the present invention according for its purpose. Examples of such additives include anti-wear agents or extreme-pressure agents other than the component (E), friction modifiers other than the component (F), antioxidants other than the component (E), corrosion inhibitors, anti-rust agents, metal deactivators, demulsifiers and defoaming agents.

As an anti-wear agent or extreme-pressure agent other than the component (E), any anti-wear agent or extreme pressure agent used for lubricating oils may be used without any particular limitations.

When the lubricating oil composition comprises an anti-wear agent or extreme-pressure agent other than the component (E), the content thereof may be, for example, 0.01 to 10 mass % on the basis of the total mass of the composition.

As a friction modifier other than the component (F), any compound usually used as an ashless friction modifier for lubricating oils may be used without any particular limitations.

When the lubricating oil composition comprises a friction modifier other than the component (F), the content thereof may be usually 0.1 to 1.0 mass %, for example 0.3 to 0.8 mass % on the basis of the total mass of the composition.

Examples of antioxidants other than the component (E) include known ashless antioxidants such as aromatic amine antioxidants, hindered amine antioxidants and phenolic antioxidants.

When the lubricating oil composition comprises an antioxidant other than the component (E), the content thereof may be usually 0.1 to 5.0 mass %, for example 0.5 to 3.0 mass % on the basis of the total mass of the composition.

As a corrosion inhibitor, for example, any known corrosion inhibitor such as benzotriazole compounds, tolyltriazole compounds, thiadiazole compounds and imidazole compounds may be used. When the lubricating oil composition comprises a corrosion inhibitor, the content thereof may be, for example, 0.005 to 5 mass % on the basis of the total mass of the composition.

As an anti-rust agent, any known anti-rust agent such as petroleum sulfonates, alkylbenzenesulfonates, dinonylnaphthalenesulfonates, alkylsulfonate salts, fatty acid soaps, fatty acids, alkenylsuccinimide half esters, fatty acid polyol esters, fatty acid amine salts, oxidized paraffins and alkyl polyoxyethylene ethers may be used. When the lubricating oil composition comprises an anti-rust agent, the content thereof may be, for example, 0.005 to 5 mass % on the basis of the total mass of the composition. In the present specification, any organic acid metal base that can form a micelle in the base oil all contribute to the content of the component (B), that is, the metallic detergent even if not being an additive commercially available as a metallic detergent.

As a metal deactivator, for example, any known metal deactivator such as imidazolines, pyrimidine derivatives, alkylthiadiazoles, mercaptobenzothiazoles, benzotriazoles and derivatives thereof, 1,3,4-thiadiazole polysulfide, dithiocarbamate), 2-(alkyldithio)benzimidazole and β-(o-carboxybenzylthio)propionitrile may be used. When the lubricating oil composition comprises a metal deactivator, the content thereof may be, for example, 0.005 to 1 mass % on the basis of the total mass of the composition.

As a demulsifier, for example, any known demulsifier such as polyalkylene glycol nonionic surfactants may be used. When the lubricating oil composition comprises a demulsifier, the content thereof may be, for example, 0.005 to 5 mass % on the basis of the total mass of the composition.

As a defoaming agent, any known defoaming agent such as silicones, fluorosilicones and fluoroalkyl ethers may be used. When the lubricating oil composition comprises a defoaming agent, the content thereof may be, for example, 0.0001 to 0.1 mass % on the basis of the total mass of the composition.

As a coloring agent, for example, any known coloring agent such as azo compounds may be used.

<Lubricating Oil Composition>

The kinematic viscosity of the lubricating oil composition at 100° C. is preferably no less than 6.1 mm$^2$/s, more preferably no less than 6.2 mm$^2$/s, and further preferably no less than 6.3 mm$^2$/s in view of improvement of lubricity. This kinematic viscosity at 100° C. is preferably no more than 8.2 mm$^2$/s, more preferably no more than 7.9 mm$^2$/s, and further preferably no more than 7.6 mm$^2$/s in view of improvement of fuel efficiency. In one embodiment, this kinematic viscosity may be 6.1 to 8.2 mm$^2$/s, or 6.2 to 7.9 mm$^2$/s, or 6.3 to 7.6 mm$^2$/s.

The kinematic viscosity of the lubricating oil composition at 40° C. is preferably no less than 20.0 mm$^2$/s, more preferably no less than 22.0 mm$^2$/s, and further preferably no less than 24.0 mm$^2$/s in view of improvement of lubricity. This kinematic viscosity at 40° C. is preferably no more than 35.0 mm$^2$/s, more preferably no more than 32.0 mm$^2$/s, and further preferably no more than 29.0 mm$^2$/s in view of improvement of fuel efficiency and low-temperature viscosity characteristics when the composition is a fresh oil. In one embodiment, this kinematic viscosity may be 20.0 to 35.0 mm$^2$/s, or 22.0 to 32.0 mm$^2$/s, or 24.0 to 29.0 mm$^2$/s.

The viscosity index of the lubricating oil composition is preferably no less than 140, more preferably no less than 160, further preferably no less than 180, and particularly preferably no less than 200 in view of improvement of fuel efficiency while the HTHS viscosity at 150° C. is maintained, and in view of reduction of the low-temperature viscosity (for example, at −35° C. that is the measurement temperature of the CCS viscosity specified in the SAE viscosity grade 0W-X, known as a viscosity grade of fuel-economy oils) when the composition is a fresh oil. In one embodiment, this viscosity index may be no less than 210. The upper limit of the viscosity index of the lubricating oil composition is not particularly limited and, for example, may be no more than 250, or no more than 240, or no more than 230.

The HTHS viscosity of the lubricating oil composition at 150° C. is no less than 2.25 mPa·s in view of improvement of lubricity, and is less than 2.55 mPa·s, and preferably no more than 2.54 mPa·s in view of improvement of fuel efficiency. In one embodiment, this HTHS viscosity may be no less than 2.25 mPa·s and less than 2.55 mPa·s, or 2.25 to 2.54 mPa·s. In the present specification, a HTHS viscosity at 150° C. means a high temperature high shear viscosity at 150° C. as defined in ASTM D4683.

The HTHS viscosity of the lubricating oil composition at 100° C. is preferably no less than 3.7 mPa·s and more preferably no less than 4.3 mPa·s in view of improvement of lubricity, and is no more than 5.2 mPa·s and more preferably no more than 4.9 mPa·s in view of improvement of fuel efficiency. In one embodiment, this HTHS viscosity may be 3.7 to 5.2 mPa·s, or 4.3 to 5.2 mPa·s, or 4.3 to 4.9 mPa·s. In the present specification, "HTHS viscosity at 100° C." means a high temperature high shear viscosity at 100° C. as defined in ASTM D4683.

EXAMPLES

Hereinafter the present invention will be more specifically described based on examples and comparative examples. The present invention is not limited to these examples.

Examples 1 to 14 and Comparative Examples 1 to 13

The lubricating oil compositions according to the present invention (examples 1 to 14) and lubricating oil compositions for comparison (comparative examples 1 to 13) were prepared using the following base oils and additives. The formulation of each composition is shown in Tables 1 to 6. In Tables 1 to 6, for the items of "base oil composition", "mass %" represents mass % on the basis of the total mass of the base oils (100%); for the item of "(C) Polymer (in terms of resin content)", "mass %" represents mass % in terms of resin content on the basis of the total mass of the composition (100%); and for the other items, "mass %" represents mass % on the basis of the total mass of the composition (100%), "mass ppm" represents mass ppm on the basis of the total mass of the composition, and "mass ppm/X" for an element X represents mass ppm in terms of the element X on the basis of the total mass of the composition.

(Base oils)
O-1: Group III base oil of API base stock categories (hydrocracked mineral base oil, Yubase™ 4 from SK Lubricants Co., Ltd.), kinematic viscosity (100° C.): 4.2 mm²/s, kinematic viscosity (40° C.): 19.3 mm²/s, viscosity index: 125, % $C_P$: 79.4, % $C_N$: 20.6, % $C_A$: 0.0, sulfur content: less than 10 mass ppm
O-2: Group IV base oil of API base stock categories (poly α-olefin base oil, Durasyn™ 164 from INEOS), kinematic viscosity (100° C.): 3.9 mm²/s, kinematic viscosity (40° C.): 17.4 mm²/s, viscosity index: 122

(Metallic Detergents)
B-1: calcium carbonate-overbased calcium salicylate, Ca content: 8.0 mass %, base number (perchloric acid method): 225 mgKOH/g, metal ratio: 3.3
B-2: magnesium carbonate-overbased magnesium salicylate, Mg content: 7.5 mass %, base number (perchloric acid method): 342 mgKOH/g, metal ratio: 3.3
B-3*: calcium carbonate-overbased calcium sulfonate, Ca content: 11.6 mass %, base number (perchloric acid method): 302 mgKOH/g, metal ratio: 13.9
B-4*: magnesium carbonate-overbased magnesium sulfonate, Mg content: 9.1 mass %, base number (perchloric acid method): 405 mgKOH/g, metal ratio: 27.7

(Polymers)
C-1: comb-shaped poly(meth)acrylate, weight average molecular weight: 770,000, polydispersity index: 2.31
C-2: comb-shaped poly(meth)acrylate, weight average molecular weight: 420,000, polydispersity index: 3.04
C-3*: comb-shaped poly(meth)acrylate, weight average molecular weight: 430,000, polydispersity index: 5.16
C-4*: comb-shaped poly(meth)acrylate, weight average molecular weight: 150,000, polydispersity index: 2.48
C-5*: linear poly(meth)acrylate, weight average molecular weight: 560,000, polydispersity index: 2.31
C-6*: dispersant linear poly(meth)acrylate, weight average molecular weight: 290,000, polydispersity index: 3.95
C-7*: hydrogenated styrene-isoprene copolymer, weight average molecular weight: 440,000, polydispersity index: 1.55

(Succinimide Dispersant)
D-1: non-modified polybutenyl succinimide, N content: 1.2 mass %
D-2: boric acid-modified polybutenyl succinimide, N content: 5.5 mass %, B content: 2.6 mass %
D-3*: formamide-modified polybutenyl succinimide, N content: 1.1 mass %

(E) ZnDTP: zinc dialkyldithiophosphate, P content: 15.6 mass %, S content: 32.3 mass %, Zn content: 16.5 mass %, alkyl group: combination of primary $C_8$ alkyl group, isopropyl group, and secondary $C_6$ alkyl group (F) MoDTC: sulfurized (oxy)molybdenum dithiocarbamate (SAKURA-LUBE™ 515 manufactured by ADEKA Corporation), Mo content: 10.1 mass %

(Antioxidants)
G-1: amine antioxidant (diphenylamine)
G-2: hindered phenolic antioxidant (Other Additives)
demulsifier (anti-rust agent): vinyl acetate-alkyl fumarate copolymer

TABLE 1

|  |  | Examples | | | | |
|---|---|---|---|---|---|---|
|  |  | 1 | 2 | 3 | 4 | 5 |
| Base oil composition | | | | | | |
| O-1 | mass % | 100 | 100 | 100 | 100 | 100 |
| O-2 | mass % | — | — | — | — | — |
| Properties of total base oil | | | | | | |
| kinematic viscosity (100° C.) | mm²/s | 4.2 | 4.2 | 4.2 | 4.2 | 4.2 |
| kinematic viscosity (40° C.) | mm²/s | 19.3 | 19.3 | 19.3 | 19.3 | 19.3 |
| (A) Total base oil | | balance | balance | balance | balance | balance |
| (B) Metallaic detergent | | | | | | |
| B-1 mass | % | 1.75 | 1.75 | 1.50 | 2.25 | — |
| B-2 mass | % | 0.57 | 0.57 | — | — | 1.60 |
| B-3* mass | % | — | — | — | — | — |
| B-4* mass | % | — | — | — | — | — |
| total metal content | mass ppm | 1800 | 1800 | 1200 | 1800 | 1200 |
| total Ca | mass ppm | 1400 | 1400 | 1200 | 1800 | 0 |
| Ca (from soap content) | mass ppm | 424 | 424 | 364 | 545 | 0 |
| total Mg | mass ppm | 400 | 400 | 0 | 0 | 1200 |
| Mg (from soap content) | mass ppm | 121 | 121 | 0 | 0 | 364 |
| total soap base | mmol/kg | 31.3 | 31.3 | 18.1 | 27.2 | 30.3 |
| total salicylate soap base | mmol/kg | 31.3 | 31.3 | 18.1 | 27.2 | 30.3 |
| salicylate soap base ratio | mol % | 100 | 100 | 100 | 100 | 100 |
| (C) Polymer (in terms of resin content) | | | | | | |
| C-1 | mass % | 1.7 | 1.7 | 1.7 | 1.7 | 1.7 |
| C-2 | mass % | — | — | — | — | — |

TABLE 1-continued

| | | Examples | | | | |
|---|---|---|---|---|---|---|
| | | 1 | 2 | 3 | 4 | 5 |
| C-3* | mass % | — | — | — | — | — |
| C-4* | mass % | — | — | — | — | — |
| C-5* | mass % | — | — | — | — | — |
| C-6* | mass % | — | — | — | — | — |
| C-7* | mass % | — | — | — | — | — |
| (D) Ashless dispersant | | | | | | |
| D-1 | mass ppm/N | 350 | 350 | 350 | 350 | 350 |
| D-2 | mass ppm/N | 230 | 230 | 230 | 230 | 230 |
| | mass ppm/B | 110 | 110 | 110 | 110 | 110 |
| D-3* | mass ppm/N | — | — | — | — | — |
| total nitrogen content | mass ppm/N | 580 | 580 | 580 | 580 | 580 |
| proportion of non-modified + boric acid-modified | mass % | 100 | 100 | 100 | 100 | 100 |
| (E) ZnDTP | mass ppm/P | 780 | — | 780 | 780 | 780 |
| (F) MoDTC | mass ppm/Mo | 0 | 0 | 0 | 0 | 0 |
| (G) Antioxidant | | | | | | |
| G-1 | mass % | 0.60 | — | 0.60 | 0.60 | 0.60 |
| G-2 | mass % | 1.20 | — | 1.20 | 1.20 | 1.20 |
| Demulsifier (anti-rust agent) | mass % | 0.05 | — | 0.05 | 0.05 | 0.05 |
| Properties of composition | | | | | | |
| kinematic viscosity (100° C.) | mm$^2$/s | 6.43 | 6.35 | 6.32 | 6.57 | 6.37 |
| kinematic viscosity (40° C.) | mm$^2$/s | 25.73 | 25.41 | 25.14 | 26.24 | 25.28 |
| HTHS viscosity (150° C.) | mPa·s | 2.3 | 2.3 | 2.3 | 2.3 | 2.3 |
| Iron ball sinking test: time | s | 2.5 | 2.5 | 2.5 | 2.5 | 2.5 |

TABLE 2

| | | Examples | | | | |
|---|---|---|---|---|---|---|
| | | 6 | 7 | 8 | 9 | 10 |
| Base oil composition | | | | | | |
| O-1 | mass % | 100 | 100 | 100 | 100 | 100 |
| O-2 | mass % | — | — | — | — | — |
| Properties of total base oil | | | | | | |
| kinematic viscosity (100° C.) | mm$^2$/s | 4.2 | 4.2 | 4.2 | 4.2 | 4.2 |
| kinematic viscosity (40° C.) | mm$^2$/s | 19.3 | 19.3 | 19.3 | 19.3 | 19.3 |
| (A) Total base oil | | balance | balance | balance | balance | balance |
| (B) Metallaic detergent | | | | | | |
| B-1 | mass % | — | 1.75 | 1.75 | 1.75 | 1.75 |
| B-2 | mass % | 2.40 | 0.53 | 0.53 | 0.53 | 0.53 |
| B-3* | mass % | — | — | — | — | — |
| B-4* | mass % | — | — | — | — | — |
| total metal content | mass ppm | 1800 | 1800 | 1800 | 1800 | 1800 |
| total Ca | mass ppm | 0 | 1400 | 1400 | 1400 | 1400 |
| Ca (from soap content) | mass ppm | 0 | 424 | 424 | 424 | 424 |
| total Mg | mass ppm | 1800 | 400 | 400 | 400 | 400 |
| Mg (from soap content) | mass ppm | 545 | 121 | 121 | 121 | 121 |
| total soap base | mmol/kg | 45.4 | 31.3 | 31.3 | 31.3 | 31.3 |
| total salicylate soap base | mmol/kg | 45.4 | 31.3 | 31.3 | 31.3 | 31.3 |
| salicylate soap base ratio | mol % | 100 | 100 | 100 | 100 | 100 |
| (C) Polymer (in terms of resin content) | | | | | | |
| C-1 | mass % | 1.7 | 1.7 | 1.7 | 1.7 | 1.7 |
| C-2 | mass % | — | — | — | — | — |
| C-3* | mass % | — | — | — | — | — |
| C-4* | mass % | — | — | — | — | — |
| C-5* | mass % | — | — | — | — | — |
| C-6* | mass % | — | — | — | — | — |
| C-7* | mass% | — | — | — | — | — |
| (D) Ashless dispersant | | | | | | |
| D-1 | mass ppm/N | 350 | 580 | — | 350 | 350 |
| D-2 | mass ppm/N | 230 | — | 580 | 230 | 230 |
| | mass ppm/B | 110 | — | 280 | 110 | 110 |

TABLE 2-continued

|  |  | Examples | | | | |
| --- | --- | --- | --- | --- | --- | --- |
|  |  | 6 | 7 | 8 | 9 | 10 |
| D-3* | mass ppm/N | — | — | — | — | — |
| total nitrogen content | mass ppm/N | 580 | 580 | 580 | 580 | 580 |
| proportion of non-modified + boric acid-modified | mass % | 100 | 100 | 100 | 100 | 100 |
| (E) ZnDTP | mass ppm/P | 780 | 780 | 780 | 780 | 780 |
| (F) MoDTC | mass ppm/Mo | 0 | 0 | 0 | 500 | 1000 |
| (G) Antioxidant |  |  |  |  |  |  |
| G-1 | mass % | 0.60 | 0.60 | 0.60 | 0.60 | 0.60 |
| G-2 | mass % | 1.20 | 1.20 | 1.20 | 1.20 | 1.20 |
| Demulsifier (anti-rust agent) | mass % | 0.05 | 0.05 | 0.05 | 0.05 | 0.05 |
| Properties of composition |  |  |  |  |  |  |
| kinematic viscosity (100° C.) | mm$^2$/s | 6.54 | 6.41 | 6.50 | 6.39 | 6.37 |
| kinematic viscosity (40° C.) | mm$^2$/s | 25.99 | 25.67 | 26.01 | 25.68 | 25.67 |
| HTHS viscosity (150° C.) | mPa·s | 2.3 | 2.3 | 2.3 | 2.3 | 2.3 |
| Iron ball sinking test: time | s | 2.5 | 2.5 | 3.0 | 2.5 | 2.5 |

TABLE 3

|  |  | Examples | | | |
| --- | --- | --- | --- | --- | --- |
|  |  | 11 | 12 | 13 | 14 |
| Base oil composition |  |  |  |  |  |
| O-1 | mass % | 100 | 100 | 100 | — |
| O-2 | mass % | — | — | — | 100 |
| Properties of total base oil |  |  |  |  |  |
| kinematic viscosity (100° C.) | mm$^2$/s | 4.2 | 4.2 | 4.2 | 3.9 |
| kinematic viscosity (40° C.) | mm$^2$/s | 19.3 | 19.3 | 19.3 | 17.4 |
| (A) Total base oil |  | balance | balance | balance | balance |
| (B) Metallaic detergent |  |  |  |  |  |
| B-1 | mass % | 1.75 | — | 1.75 | 1.75 |
| B-2 | mass % | 0.53 | 1.87 | — | 0.53 |
| B-3* | mass % | — | 0.34 | — | — |
| B-4* | mass % | — | — | 0.44 | — |
| total metal content | mass ppm | 1800 | 1800 | 1800 | 1800 |
| total Ca | mass ppm | 1400 | 400 | 1400 | 1400 |
| Ca (from soap content) | mass ppm | 424 | 29 | 424 | 424 |
| total Mg | mass ppm | 400 | 1400 | 400 | 400 |
| Mg (from soap content) | mass ppm | 121 | 424 | 14 | 121 |
| total soap base | mmol/kg | 31.3 | 36.7 | 22.4 | 31.3 |
| total salicylate soap base | mmol/kg | 31.3 | 35.3 | 21.2 | 31.3 |
| salicylate soap base ratio | mol % | 100 | 96 | 95 | 100 |
| (C) Polymer (in terms of resin content) |  |  |  |  |  |
| C-1 | mass % | — | 1.7 | 1.7 | 2.3 |
| C-2 | mass % | 1.5 | — | — | — |
| C-3* | mass % | — | — | — | — |
| C-4* | mass % | — | — | — | — |
| C-5* | mass % | — | — | — | — |
| C-6* | mass % | — | — | — | — |
| C-7* | mass % |  |  |  |  |

TABLE 3-continued

|  |  | Examples | | | |
| --- | --- | --- | --- | --- | --- |
|  |  | 11 | 12 | 13 | 14 |
| (D) Ashless dispersant | | | | | |
| D-1 | mass ppm/N | 350 | 350 | 350 | 350 |
| D-2 | mass ppm/N | 230 | 230 | 230 | 230 |
|  | mass ppm/B | 110 | 110 | 110 | 110 |
| D-3* | mass ppm/N | — | — | — | — |
| total nitrogen content | mass ppm/N | 580 | 580 | 580 | 580 |
| proportion of non-modified + boric acid-modified | mass % | 100 | 100 | 100 | 100 |
| (E) ZnDTP | mass ppm/P | 780 | 780 | 780 | 780 |
| (F) MoDTC | mass ppm/Mo | 0 | 0 | 0 | 0 |
| (G) Antioxidant | | | | | |
| G-1 | mass % | 0.60 | 0.60 | 0.60 | 0.60 |
| G-2 | mass % | 1.20 | 1.20 | 1.20 | 1.20 |
| Demulsifier (anti-rust agent) | mass % | 0.05 | 0.05 | 0.05 | 0.05 |
| Properties of composition | | | | | |
| kinematic viscosity (100° C.) | mm$^2$/s | 6.48 | 6.41 | 6.45 | 6.70 |
| kinematic viscosity (40° C.) | mm$^2$/s | 26.04 | 25.95 | 25.98 | 26.80 |
| HTHS viscosity (150° C.) | mPa · s | 2.3 | 2.3 | 2.3 | 2.3 |
| Iron ball sinking test: time | s | 2.5 | 3.0 | 3.0 | 2.5 |

TABLE 4

|  |  | Comparative examples | | | | |
| --- | --- | --- | --- | --- | --- | --- |
|  |  | 1 | 2 | 3 | 4 | 5 |
| Base oil composition | | | | | | |
| O-1 | mass % | 100 | 100 | 100 | 100 | 100 |
| O-2 | mass % | — | — | — | — | — |
| Properties of total base oil | | | | | | |
| kinematic viscosity (100° C.) | mm$^2$/s | 4.2 | 4.2 | 4.2 | 4.2 | 4.2 |
| kinematic viscosity (40° C.) | mm$^2$/s | 19.3 | 19.3 | 19.3 | 19.3 | 19.3 |
| (A) Total base oil | | balance | balance | balance | balance | balance |
| (B) Metallaic detergent | | | | | | |
| B-1 | mass % | 1.75 | 1.75 | 1.75 | 1.75 | 1.75 |
| B-2 | mass % | 0.53 | 0.53 | 0.53 | 0.53 | 0.53 |
| B-3* | mass % | — | — | — | — | — |
| B-4* | mass % | — | — | — | — | — |
| total metal content | mass ppm | 1800 | 1800 | 1800 | 1800 | 1800 |
| total Ca | mass ppm | 1400 | 1400 | 1400 | 1400 | 1400 |
| Ca (from soap content) | mass ppm | 424 | 424 | 424 | 424 | 42 |
| total Mg | mass ppm | 400 | 400 | 400 | 400 | 400 |
| Mg (from soap content) | mass ppm | 121 | 121 | 121 | 121 | 121 |
| total soap base | mmol/kg | 31.3 | 31.3 | 31.3 | 31.3 | 31.3 |
| total salicylate soap base | mmol/kg | 31.3 | 31.3 | 31.3 | 31.3 | 31.3 |
| salicylate soap base ratio | mol % | 100 | 100 | 100 | 100 | 100 |
| (C) Polymer (in terms of resin content) | | | | | | |
| C-1 | mass % | — | — | — | — | — |
| C-2 | mass % | — | — | — | — | — |
| C-3* | mass % | 1.3 | — | — | — | — |
| C-4* | mass % | — | 1.0 | — | — | — |
| C-5* | mass % | — | — | 1.4 | — | — |

TABLE 4-continued

|  |  | Comparative examples | | | | |
|---|---|---|---|---|---|---|
|  |  | 1 | 2 | 3 | 4 | 5 |
| C-6* | mass % | — | — | — | 1.1 | — |
| C-7* | mass % | — | — | — | — | 1.3 |
| (D) Ashless dispersant |  |  |  |  |  |  |
| D-1 | mass ppm/N | 350 | 350 | 350 | 350 | 350 |
| D-2 | mass ppm/N | 230 | 230 | 230 | 230 | 230 |
|  | mass ppm/B | 110 | 110 | 110 | 110 | 110 |
| D-3* | mass ppm/N | — | — | — | — | — |
| total nitrogen content | mass ppm/N | 580 | 580 | 580 | 580 | 580 |
| proportion of non-modified + boric acid-modified | mass % | 100 | 100 | 100 | 100 | 100 |
| (E) ZnDTP | mass ppm/P | 780 | 780 | 780 | 780 | 780 |
| (F) MoDTC | mass ppm/Mo | 0 | 0 | 0 | 0 | 0 |
| (G) Antioxidant |  |  |  |  |  |  |
| G-1 | mass % | 0.60 | 0.60 | 0.60 | 0.60 | 0.60 |
| G-2 | mass % | 1.20 | 1.20 | 1.20 | 1.20 | 1.20 |
| Demulsifier (anti-rust agent) | mass % | 0.05 | 0.05 | 0.05 | 0.05 | 0.05 |
| Properties of composition |  |  |  |  |  |  |
| kinematic viscosity (100° C.) | mm$^2$/s | 6.59 | 6.91 | 6.47 | 7.01 | 7.28 |
| kinematic viscosity (40° C.) | mm$^2$/s | 26.42 | 28.56 | 28.14 | 33.96 | 39.50 |
| HTHS viscosity (150° C.) | mPa·s | 2.3 | 2.3 | 2.3 | 2.3 | 2.3 |
| Iron ball sinking test: time | s | no sinking | no sinking | no sinking | no sinking | no sinking |

TABLE 5

|  |  | Comparative examples | | | | |
|---|---|---|---|---|---|---|
|  |  | 6 | 7 | 8 | 9 | 10 |
| Base oil composition |  |  |  |  |  |  |
| O-1 | mass % | 100 | 100 | 100 | 100 | 100 |
| O-2 | mass % | — | — | — | — | — |
| Properties of total base oil |  |  |  |  |  |  |
| kinematic viscosity (100° C.) | mm$^2$/s | 4.2 | 4.2 | 4.2 | 4.2 | 4.2 |
| kinematic viscosity (40° C.) | mm$^2$/s | 19.3 | 19.3 | 19.3 | 19.3 | 19.3 |
| (A) Total base oil |  | balance | balance | balance | balance | balance |
| (B) Metallaic detergent |  |  |  |  |  |  |
| B-1 | mass % | — | — | — | — | 0.50 |
| B-2 | mass % | — | — | — | — | — |
| B-3* | mass % | 1.55 | — | 1.21 | 0.34 | — |
| B-4* | mass % | — | 1.98 | 0.44 | 1.54 | 1.54 |
| total metal content | mass ppm | 1800 | 1800 | 1800 | 1800 | 1800 |
| total Ca | mass ppm | 1800 | 0 | 1400 | 400 | 400 |
| Ca (from soap content) | mass ppm | 129 | 0 | 101 | 29 | 121 |
| total Mg | mass ppm | 0 | 1800 | 400 | 1400 | 1400 |
| Mg (from soap content) | mass ppm | 0 | 65 | 14 | 51 | 51 |
| total soap base | mmol/kg | 6.5 | 5.4 | 6.2 | 5.6 | 10.3 |
| total salicylate soap base | mmol/kg | 0.0 | 0.0 | 0.0 | 0.0 | 6.0 |
| salicylate soap base ratio | mol % | 0 | 0 | 0 | 0 | 59 |
| (C) Polymer (in terms of resin content) |  |  |  |  |  |  |
| C-1 | mass % | 1.7 | 1.7 | 1.7 | 1.7 | 1.7 |
| C-2 | mass % | — | — | — | — | — |
| C-3* | mass % | — | — | — | — | — |
| C-4* | mass % | — | — | — | — | — |
| C-5* | mass % | — | — | — | — | — |
| C-6* | mass % | — | — | — | — | — |
| C-7* | mass % | — | — | — | — | — |
| (D) Ashless dispersant |  |  |  |  |  |  |
| D-1 | mass ppm/N | 350 | 350 | 350 | 350 | 350 |
| D-2 | mass ppm/N | 230 | 230 | 230 | 230 | 230 |
|  | mass ppm/B | 110 | 110 | 110 | 110 | 110 |
| D-3* | mass ppm/N | — | — | — | — | — |
| total nitrogen content | mass ppm/N | 580 | 580 | 580 | 580 | 580 |
| proportion of non- | mass % | 100 | 100 | 100 | 100 | 100 |

TABLE 5-continued

|  |  | Comparative examples | | | | |
| --- | --- | --- | --- | --- | --- | --- |
|  |  | 6 | 7 | 8 | 9 | 10 |
| modified + boric acid-modified |  |  |  |  |  |  |
| (E) ZnDTP | mass ppm/P | 780 | 780 | 780 | 780 | 780 |
| (F) MoDTC | mass ppm/Mo | 0 | 0 | 0 | 0 | 0 |
| (G) Antioxidant |  |  |  |  |  |  |
| G-1 | mass % | 0.60 | 0.60 | 0.60 | 0.60 | 0.60 |
| G-2 | mass % | 1.20 | 1.20 | 1.20 | 1.20 | 1.20 |
| Demulsifier (anti-rust agent) | mass % | 0.05 | 0.05 | 0.05 | 0.05 | 0.05 |
| Properties of composition |  |  |  |  |  |  |
| kinematic viscosity (100° C.) | mm²/s | 6.48 | 6.51 | 6.61 | 6.68 | 6.64 |
| kinematic viscosity (40° C.) | mm²/s | 27.40 | 27.87 | 26.59 | 26.68 | 26.64 |
| HTHS viscosity (150° C.) | mPa·s | 2.3 | 2.3 | 2.3 | 2.3 | 2.3 |
| Iron ball sinking test: time | s | no sinking | 9.0 | no sinking | 12.0 | 10.5 |

TABLE 6

|  |  | Comparative examples | | |
| --- | --- | --- | --- | --- |
|  |  | 11 | 12 | 13 |
| Base oil composition |  |  |  |  |
| O-1 | mass % | 100 | 100 | 100 |
| O-2 | mass % | — | — | — |
| Properties of total base oil |  |  |  |  |
| kinematic viscosity (100° C.) | mm²/s | 4.2 | 4.2 | 4.2 |
| kinematic viscosity (40° C.) | mm²/s | 19.3 | 19.3 | 19.3 |
| (A) Total base oil |  | balance | balance | balance |
| (B) Metallaic detergent |  |  |  |  |
| B-1 | mass % | 1.75 | 1.75 | 1.75 |
| B-2 | mass % | 0.53 | 0.53 | 0.53 |
| B-3* | mass % | — | — | — |
| B-4* | mass % | — | — | — |
| total metal content | mass ppm | 1800 | 1800 | 1800 |
| total Ca | mass ppm | 1400 | 1400 | 1400 |
| Ca (from soap content) | mass ppm | 424 | 424 | 424 |
| total Mg | mass ppm | 400 | 400 | 400 |
| Mg (from soap content) | mass ppm | 121 | 121 | 121 |
| total soap base | mmol/kg | 31.3 | 31.3 | 31.3 |
| total salicylate soap base | mmol/kg | 31.3 | 31.3 | 31.3 |
| salicylate soap base ratio | mol % | 100 | 100 | 100 |
| (C) Polymer (in terms of resin content) |  | 1.7 | 1.7 | 1.7 |
| C-1 | mass % | — | — | — |
| C-2 | mass % | — | — | — |
| C-3'* | mass % | — | — | — |
| C-4* | mass % | — | — | — |
| C-5* | mass % | — | — | — |
| C-6* | mass % | — | — | — |
| C-7* | mass % | — | — | — |
| (D) Ashless dispersant |  |  |  |  |
| D-1 | mass ppm/N | — | — | 350 |
| D-2 | mass ppm/N | — | — | — |
|  | mass ppm/B | — | 110 | — |
| D-3* | mass ppm/N | 500 | 350 | 250 |
| total nitrogen content | mass ppm/N | 500 | 580 | 600 |
| proportion of non-modified + boric acid-modified | mass % | 0 | 40 | 58 |
| (E) ZnDTP | mass ppm/P | 780 | 780 | 780 |
| (F) MoDTC | mass ppm/Mo | 0 | 0 | 0 |
| (G) Antioxidant |  |  |  | 0.60 |
| G-1 | mass % | 0.60 | 0.60 |  |
| G-2 | mass % | 1.20 | 1,20 | 1.20 |
| Demulsifier (anti-rust agent) | mass % | 0.05 | 0.05 | 0.05 |
| Properties of composition | mm²/s | 6.71 | 6.54 | 6.51 |
| kinematic viscosity (100° C.) | mm²/s |  |  |  |

TABLE 6-continued

|  |  | Comparative examples | | |
|---|---|---|---|---|
|  |  | 11 | 12 | 13 |
| kinematic viscosity (40° C.) | mm²/s | 27.11 | 27.04 | 26.37 |
| HTHS viscosity (150° C.) | mPa · s | 2.3 | 2.3 | 2.3 |
| Iron ball sinking test: time | s | no sinking | no sinking | 11 |

(Iron Ball Sinking Test)

For each of the lubricating oil compositions, the low-temperature fluidity of the composition when contaminated with water was evaluated by the following test with reference to ASTM D7563.

A sample oil contaminated with water was prepared by admixing water and a regular gasoline with the lubricating oil composition. Water and the regular gasoline were present in the sample oil each in an amount of 15 mass % on the basis of the total mass of the sample oil. Into a 500 mL beaker, 300 g of the sample oil was put. The beaker and a homogenizer were fixed so that the distance from a shaft tip of the homogenizer (POLYTRON® PT 10-35 GT, the shaft was PT-DA 20/2 EC-B193) to the bottom of the beaker was 5 mm, and the sample oil was stirred for 13 minutes at 12000 rpm in rotation speed of the shaft of the homogenizer. Thereafter the sample oil was transferred from the beaker to a 500 mL graduated measuring cylinder (52 mm in inner diameter). The graduated measuring cylinder was put in a thermostatic bath within 10 minutes after completion of the stirring, cooled from 25° C. to −30° C. at −10° C./h in cooling rate, and kept cooled at −30° C. for 40 hours. After the cooling, the graduated measuring cylinder was taken out of the thermostatic bath. An iron ball (mass: 0.25 mg) was gently put onto the surface of the sample oil within 10 seconds after the graduated measuring cylinder was taken out of the thermostatic bath, and thereafter the iron ball was freed. The time taken for the iron ball to sink from the surface of the sample oil and reach the bottom face of the graduated measuring cylinder was measured. The results are shown in Tables 1-6. A shorter time taken for the sinking means better low-temperature fluidity of the composition when contaminated with water. In Tables 1 to 6, the term "no sinking" means that no sinking of the iron ball was observed (i.e., shear stress applied to the sample oil by the iron ball did not reach the yield stress of the sample oil).

(Evaluation Results)

Concerning all of the lubricating oil compositions of examples 1 to 14, the iron ball sank fast; that is, all of the lubricating oil compositions of examples 1 to 15 had good low-temperature fluidity when contaminated with water.

Concerning the composition of comparative example 1 using the comb-shaped poly(meth)acrylate having a polydispersity index of more than 4.0 as the polymer, no sinking of the iron ball was observed in the iron ball sinking test.

Concerning the composition of comparative example 2 using the comb-shaped poly(meth)acrylate having a weight average molecular weight of less than 350,000 as the polymer, no sinking of the iron ball was observed in the iron ball sinking test.

Concerning the compositions of comparative examples 3 and 4 using the poly(meth)acrylate that was not comb-shaped as the polymer, no sinking of the iron ball was observed in the iron ball sinking test.

Concerning the composition of comparative example 5 using the hydrogenated styrene-isoprene copolymer as the polymer, no sinking of the iron ball was observed in the iron ball sinking test.

Concerning the compositions of comparative examples 6 to 9 using only the sulfonate detergent as the metallic detergent, no sinking of the iron ball was observed in the iron ball sinking test, or the required time for the sinking was remarkably longer than the compositions of the examples.

Concerning the composition of comparative example 10 containing the metallic detergent in too small an amount in terms of a salicylate soap base, although the sinking of the iron ball was observed, the time required for the sinking was remarkably longer than the compositions of the examples.

Concerning the composition of comparative example 11 using only the succinimide dispersant modified by a compound other than boric acid (formamide) as the succinimide dispersant, no sinking of the iron ball was observed in the iron ball sinking test.

Concerning the compositions of comparative examples 12 and 13 in which a ratio of the total nitrogen content derived from the non-modified succinimide dispersant and the boric acid-modified succinimide dispersant to the total nitrogen content of the succinimide dispersant was too low, no sinking of the iron ball was observed, or the required time for the sinking was remarkably longer than the compositions of the examples.

Industrial Applicability

The lubricating oil composition for an internal combustion engine according to the present invention can suppress degradation of low-temperature fluidity when the composition is contaminated with water. Thus, the lubricating oil composition for an internal combustion engine according to the present invention may be preferably used to lubricate internal combustion engines operated under the condition where water tends to accumulate thereinside, especially engines for hybrid electric vehicles, particularly engines for parallel-hybrid electric vehicles.

I claim:

1. A lubricating oil composition for an internal combustion engine, the composition consisting of:
   (A) a lubricating base oil comprising at least one mineral base oil or at least one synthetic base oil or any combination thereof, and having a kinematic viscosity at 100° C. of 3.8 to 4.6 mm²/s;
   (B) a metallic detergent comprising at least one metal salicylate detergent, wherein the component (B) is present in an amount of 1000 to 2000 mass ppm in terms of metal content on the basis of the total mass of the composition, and wherein the component (B) is present in an amount of no less than 10 mmol/kg in terms of total molar amount of any salicylate soap base per kilogram of the composition, and wherein the component (B) is overbased with at least one basic metal salt, wherein the at least one basic metal salt overbasing the component (B) consists of:
     at least one first basic metal salt selected from the group consisting of at least one metal carbonate, at least one alkaline earth metal borate, and any combination thereof; and optionally at least one second basic metal salt selected from the group consisting of at least one alkali metal hydroxide, at least one alkaline earth metal hydroxide, at least one alkali metal oxide, at least one alkaline earth metal oxide, and any combination thereof; and at least one additive other than any metallic detergent, the at least one additive comprising:

(C) at least one comb-shaped poly(meth)acrylate in an amount of 1.0 to 4.0 mass % in terms of resin content on the basis of the total mass of the composition, the comb-shaped poly(meth)acrylate having a weight average molecular weight of 350,000 to 1,000,000 and a polydispersity index of no more than 4.0, wherein each said comb-shaped poly(meth)acrylate is obtained by polymerization of a monomer composition consisting of:
at least one poly(meth)acrylate macromonomer (M-6);
at least one monomer selected from the group consisting of
at least one monomer (M-1) represented by the following general formula (4), at least one monomer (M-2) represented by the following general formula (5), at least one monomer (M-3) represented by the following general formula (6), at least one monomer (M-4) represented by the following general formula (7), at least one monomer (M-5) represented by the following general formula (8), and any combination thereof,
wherein the macromonomer (M-6) is obtained via polymerizing:
at least one monomer selected from the group consisting of the monomers (M-1), (M-2), (M-3), and (M-4), and any combination thereof, and
optionally at least one said monomer (M-5),
and wherein the macromonomer (M-6) has a single polymerizable functional group in one molecule; and (D) a succinimide dispersant in an amount of 100 to 1000 mass ppm in terms of nitrogen on the basis of the total mass of the composition, the component (D) comprising at least one non-modified succinimide dispersant or at least one boric acid-modified succinimide dispersant or any combination thereof, wherein a total nitrogen content derived from the non-modified succinimide dispersant and the boric acid-modified succinimide dispersant is no less than 70 mass % of a total nitrogen content of the component (D), wherein the composition has HTHS viscosity at 150° C. of no less than 2.25 mPa·s and less than 2.55 mPa·s:

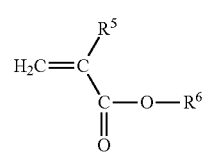

(4)

wherein in the general formula (4), $R^3$ represents a hydrogen atom or a methyl group; and $R^4$ represents a linear or branched chain $C_{1-5}$ alkyl group;

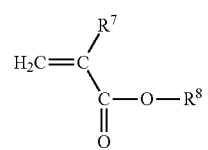

(5)

wherein in the general formula (5), $R^5$ represents a hydrogen atom or a methyl group; and $R^6$ represents a linear or branched chain $C_{6-18}$ alkyl group;

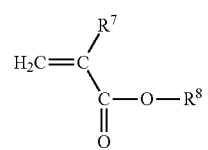

(6)

wherein in the general formula (6), $R^7$ represents a hydrogen atom or a methyl group; and $R^8$ represents a linear or branched chain hydrocarbon alkyl group having a carbon number of no less than 19;

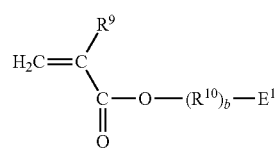

(7)

wherein in the general formula (7), $R^9$ represents a hydrogen atom or a methyl group; $R^{10}$ represents a $C_{1-18}$ alkylene group; $E^1$ represents an amine residue having 1 to 2 nitrogen atoms and 0 to 2 oxygen atoms, or a heterocyclic residue having 1 to 2 nitrogen atoms and 0 to 2 oxygen atoms; and b represents 0 or 1; and

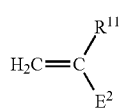

(8)

wherein in the general formula (8), $R^{11}$ represents a hydrogen atom or a methyl group; and $E^2$ represents an amine residue having 1 to 2 nitrogen atoms and 0 to 2 oxygen atoms, or a heterocyclic residue having 1 to 2 nitrogen atoms and 0 to 2 oxygen atoms.

2. The lubricating oil composition according to claim 1, wherein the (A) lubricating base oil is at least one Group III base oil of API base stock categories, or at least one Group IV base oil of API base stock categories, or any combination thereof.

3. The lubricating oil composition according to claim 1, wherein the component (B) is present in an amount of no less than 15 mmol/kg in terms of total molar amount of any soap base per kilogram of the composition.

4. The lubricating oil composition according to claim 1, wherein a total salicylate soap base of the component (B) is no less than 50 mol % of a total soap base of the component (B).

5. The lubricating oil composition according to claim 1, wherein the component (C) has a weight average molecular weight of greater than 400,000 and no more than 1,000,000.

6. The lubricating oil composition according to claim 1, wherein a ratio B/N of a total boron content B of the component (D) to a total nitrogen content N of the component (D) is 0 to 0.60.

7. The lubricating oil composition according to claim 1, wherein the component (D) is a condensation reaction product of an alkyl- or alkenyl-succinic acid or anhydride thereof with a polyamine, or a modified product of the condensation reaction product, or any combination thereof, wherein the alkyl- or alkenyl-succinic acid has an alkyl or alkenyl group having 40 to 400 carbon atoms.

8. A method for lubricating an internal combustion engine of a hybrid electric vehicle, comprising
supplying the lubricating oil composition of claim 1 to an internal combustion engine of a hybrid electric vehicle.

9. The lubricating oil composition according to claim 1, wherein the at least one basic metal salt overbasing the component (B) consists of:
at least one first basic metal salt selected from the group consisting of at least one alkali metal carbonate, at least one alkaline earth metal carbonate, and any combination thereof; and
optionally at least one second basic metal salt selected from the group consisting of at least one alkali metal hydroxide, at least one alkaline earth metal hydroxide, at least one alkali metal oxide, at least one alkaline earth metal oxide, and any combination thereof.

10. The lubricating oil composition according to claim 1, wherein the at least one basic metal salt overbasing the component (B) consists of:
at least one first basic metal salt selected from the group consisting of at least one alkaline earth metal carbonate, at least one alkaline earth metal borate, and any combination thereof; and
optionally at least one second basic metal salt selected from the group consisting of at least one alkaline earth metal hydroxide, at least one alkaline earth metal oxide, and any combination thereof.

11. The lubricating oil composition according to claim 1, wherein the at least one basic metal salt overbasing the component (B) consists of:
at least one alkaline earth metal carbonate; and
optionally at least one second basic metal salt selected from the group consisting of at least one alkaline earth metal hydroxide, at least one alkaline earth metal oxide, and any combination thereof.

12. The lubricating oil composition according to claim 1, wherein the component (B) consists of at least one overbased product of at least one organic acid alkaline earth metal salt.

13. The lubricating oil composition according to claim 9, wherein the component (B) consists of at least one overbased product of at least one organic acid alkaline earth metal salt.

14. The lubricating oil composition according to claim 10, wherein the component (B) consists of at least one overbased product of at least one organic acid alkaline earth metal salt.

15. The lubricating oil composition according to claim 11, wherein the component (B) consists of at least one overbased product of at least one organic acid alkaline earth metal salt.

16. A lubricating oil composition for an internal combustion engine, the composition consisting of:
(A) a lubricating base oil comprising at least one mineral base oil or at least one synthetic base oil or any combination thereof, and having a kinematic viscosity at 100° C. of 3.8 to 4.6 mm$^2$/s;
(B) at least one metallic detergent, wherein the component (B) is present in an amount of 1000 to 2000 mass ppm in terms of metal content on the basis of the total mass of the composition; and
at least one additive other than any metallic detergent,
the at least one metallic detergent (B) consisting of at least one organic acid metal salt which can form micelles in the base oil (A), or at least one overbased product thereof, or any combination thereof,
the at least one metallic detergent (B) comprising at least one metal salicylate detergent in an amount of no less than 10 mmol/kg in terms of total molar amount of any salicylate soap base per kilogram of the composition;
the at least one additive other than any metallic detergent comprising:
(C) at least one comb-shaped poly(meth)acrylate in an amount of 1.0 to 4.0 mass % in terms of resin content on the basis of the total mass of the composition, the comb-shaped poly(meth)acrylate having a weight average molecular weight of 350,000 to 1,000,000 and a polydispersity index of no more than 4.0, wherein each said comb-shaped poly(meth)acrylate is obtained by polymerization of a monomer composition consisting of:
at least one poly(meth)acrylate macromonomer (M-6);
at least one monomer selected from the group consisting of:
at least one monomer (M-1) represented by the following general formula (4), at least one monomer (M-2) represented by the following general formula (5), at least one monomer (M-3) represented by the following general formula (6), at least one monomer (M-4) represented by the following general formula (7), at least one monomer (M-5) represented by the following general formula (8), and any combination thereof,
wherein the macromonomer (M-6) is obtained via polymerizing:
at least one monomer selected from the group consisting of the monomers (M-1), (M-2), (M-3), and (M-4), and any combination thereof, and
optionally at least one said monomer (M-5),
and wherein the macromonomer (M-6) has a single polymerizable functional group in one molecule; and
(D) a succinimide dispersant in an amount of 100 to 1000 mass ppm in terms of nitrogen on the basis of the total mass of the composition, the component (D) comprising at least one non-modified succinimide dispersant or at least one boric acid-modified succinimide dispersant or any combination thereof, wherein a total nitrogen content derived from the non-modified succinimide dispersant and the boric acid-modified succinimide dispersant is no less than 70 mass % of a total nitrogen content of the component (D), wherein the composition has HTHS viscosity at 150° C. of no less than 2.25 mPa·s and less than 2.55 mPa·s:

$$H_2C=C\begin{matrix}R^3\\C-O-R^4\\\|\\O\end{matrix} \quad (4)$$

wherein in the general formula (4), $R^3$ represents a hydrogen atom or a methyl group; and $R^4$ represents a linear or branched chain $C_{1-5}$ alkyl group;

$$H_2C=C\begin{matrix}R^5\\C-O-R^6\\\|\\O\end{matrix} \quad (5)$$

wherein in the general formula (5), $R^5$ represents a hydrogen atom or a methyl group; and $R^6$ represents a linear or branched chain $C_{6-18}$ alkyl group;

$$H_2C=C\begin{matrix}R^7\\C-O-R^8\\\|\\O\end{matrix} \quad (6)$$

wherein in the general formula (6), $R^7$ represents a hydrogen atom or a methyl group; and $R^8$ represents a linear or branched chain hydrocarbon alkyl group having a carbon number of no less than 19;

$$H_2C=C\begin{matrix}R^9\\C-O-(R^{10})_b-E^1\\\|\\O\end{matrix} \quad (7)$$

wherein in the general formula (7), $R^9$ represents a hydrogen atom or a methyl group; $R^{10}$ represents a $C_{1-18}$ alkylene group; $E^1$ represents an amine residue having 1 to 2 nitrogen atoms and 0 to 2 oxygen atoms, or a heterocyclic residue having 1 to 2 nitrogen atoms and 0 to 2 oxygen atoms; and b represents 0 or 1; and $$H_2C=C\begin{matrix}R^{11}\\E^2\end{matrix} \quad (8)$$

wherein in the general formula (8), $R^{11}$ represents a hydrogen atom or a methyl group; and $E^2$ represents an amine residue having 1 to 2 nitrogen atoms and 0 to 2 oxygen atoms, or a heterocyclic residue having 1 to 2 nitrogen atoms and 0 to 2 oxygen atoms.

17. The lubricating oil composition according to claim 16, wherein the overbased product of the at least one organic acid metal salt is a product of overbasing the organic acid metal salt with at least one basic metal salt;
the at least one basic metal salt overbasing the organic acid metal salt consists of:
  at least one first basic metal salt selected from the group consisting of at least one metal carbonate, at least one alkaline earth metal borate, and any combination thereof; and
  optionally at least one second basic metal salt selected from the group consisting of at least one alkali metal hydroxide, at least one alkaline earth metal hydroxide, at least one alkali metal oxide, at least one alkaline earth metal oxide, and any combination thereof.

18. A lubricating oil composition for an internal combustion engine, the composition consisting of:
  (A) a lubricating base oil comprising at least one mineral base oil or at least one synthetic base oil or any combination thereof, and having a kinematic viscosity at 100° C. of 3.8 to 4.6 mm²/s;
  (B) at least one metallic detergent, wherein the component (B) is present in an amount of 1000 to 2000 mass ppm in terms of metal content on the basis of the total mass of the composition; and
  at least one additive other than any metallic detergent,
  the at least one metallic detergent (B) consisting of at least one organic acid metal salt which can form micelles in the base oil (A), or at least one overbased product thereof, or any combination thereof,
  the at least one metallic detergent (B) comprising at least one metal salicylate detergent in an amount of no less than 10 mmol/kg in terms of total molar amount of any salicylate soap base per kilogram of the composition;
  the at least one additive other than any metallic detergent consisting of:
    (C) at least one comb-shaped poly(meth)acrylate in an amount of 1.0 to 4.0 mass % in terms of resin content on the basis of the total mass of the composition, the comb-shaped poly(meth)acrylate having a weight average molecular weight of 350,000 to 1,000,000 and a polydispersity index of no more than 4.0, wherein each said comb-shaped poly(meth)acrylate is obtained by polymerization of a monomer composition consisting of:
      at least one poly(meth)acrylate macromonomer (M-6);
      at least one monomer selected from the group consisting of:
        at least one monomer (M-1) represented by the following general formula (4), at least one monomer (M-2) represented by the following general formula (5), optionally at least one monomer (M-3) represented by the following general formula (6), optionally at least one monomer (M-4) represented by the following general formula (7), optionally at least one monomer (M-5) represented by the following general formula (8), and any combination thereof,
      wherein the macromonomer (M-6) is obtained via polymerizing:

at least one monomer selected from the group consisting of the monomers (M-1), (M-2), (M-3), and (M-4), and any combination thereof, and optionally at least one said monomer (M-5), and wherein the macromonomer (M-6) has a single polymerizable functional group in one molecule;

(D) a succinimide dispersant in an amount of 100 to 1000 mass ppm in terms of nitrogen on the basis of the total mass of the composition, the component (D) comprising at least one non-modified succinimide dispersant or at least one boric acid-modified succinimide dispersant or any combination thereof, wherein a total nitrogen content derived from the non-modified succinimide dispersant and the boric acid-modified succinimide dispersant is no less than 70 mass % of a total nitrogen content of the component (D);

optionally (E) at least one zinc dialkyl dithiophosphate;

optionally (F) at least one oil-soluble organic molybdenum compound; and optionally at least one additive selected from the group consisting of: at least one anti-wear or extreme-pressure agent other than the component (E), at least one friction modifier other than the component (F), at least one anti-oxidant other than the component (E), at least one corrosion inhibitor, at least one anti-rust agent, at least one metal deactivator, at least one demulsifier, at least one defoaming agent, at least one coloring agent, and any combination thereof, wherein the composition has HTHS viscosity at 150° C. of no less than 2.25 mPa·s and less than 2.55 mPa·s:

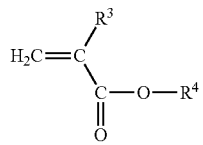
(4)

wherein in the general formula (4), $R^3$ represents a hydrogen atom or a methyl group; and $R^4$ represents a linear or branched chain $C_{1-5}$ alkyl group;

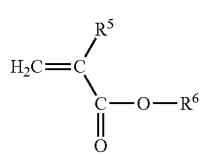
(5)

wherein in the general formula (5), $R^5$ represents a hydrogen atom or a methyl group; and $R^6$ represents a linear or branched chain $C_{6-18}$ alkyl group;

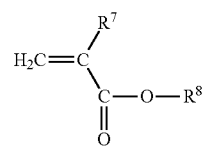
(6)

wherein in the general formula (6), $R^7$ represents a hydrogen atom or a methyl group; and $R^8$ represents a linear or branched chain hydrocarbon alkyl group having a carbon number of no less than 19;

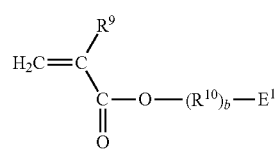
(7)

wherein in the general formula (7), $R^9$ represents a hydrogen atom or a methyl group; $R^{10}$ represents a $C_{1-18}$ alkylene group; $E^1$ represents an amine residue having 1 to 2 nitrogen atoms and 0 to 2 oxygen atoms, or a heterocyclic residue having 1 to 2 nitrogen atoms and 0 to 2 oxygen atoms; and b represents 0 or 1; and

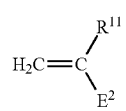
(8)

wherein in the general formula (8), $R^{11}$ represents a hydrogen atom or a methyl group; and $E^2$ represents an amine residue having 1 to 2 nitrogen atoms and 0 to 2 oxygen atoms, or a heterocyclic residue having 1 to 2 nitrogen atoms and 0 to 2 oxygen atoms.

19. The lubricating oil composition according to claim 18, wherein the overbased product of the at least one organic acid metal salt is a product of overbasing the organic acid metal salt with at least one basic metal salt;

the at least one basic metal salt overbasing the organic acid metal salt consists of:

at least one first basic metal salt selected from the group consisting of at least one metal carbonate, at least one alkaline earth metal borate, and any combination thereof; and optionally at least one second basic metal salt selected from the group consisting of at least one alkali metal hydroxide, at least one alkaline earth metal hydroxide, at least one alkali metal oxide, at least one alkaline earth metal oxide, and any combination thereof.

\* \* \* \* \*